US007503848B2

(12) United States Patent
Berman et al.

(10) Patent No.: US 7,503,848 B2
(45) Date of Patent: *Mar. 17, 2009

(54) SYSTEM AND METHOD FOR PROVIDING REPEATED ELIMINATION BONUS IN GAMING ACTIVITIES

(75) Inventors: Bradley Berman, Minnetonka, MN (US); Chad H. Shapiro, Minneapolis, MN (US); Jason Malkovich, Chaska, MN (US)

(73) Assignee: IGT, Reno, NV (US)

( * ) Notice: Subject to any disclaimer, the term of this patent is extended or adjusted under 35 U.S.C. 154(b) by 335 days.

This patent is subject to a terminal disclaimer.

(21) Appl. No.: 10/666,538

(22) Filed: Sep. 19, 2003

(65) Prior Publication Data

US 2004/0132527 A1 Jul. 8, 2004

Related U.S. Application Data

(63) Continuation of application No. 09/906,283, filed on Jul. 16, 2001, now Pat. No. 6,632,140.

(51) Int. Cl.
*A63F 13/00* (2006.01)
*A63F 9/24* (2006.01)

(52) U.S. Cl. ............................ 463/20; 463/16; 463/17; 463/18; 463/19

(58) Field of Classification Search ............ 463/16–20, 463/25–29, 40–42; 273/138.1–2, 143 R
See application file for complete search history.

(56) References Cited

U.S. PATENT DOCUMENTS 4,448,419 A * 5/1984 Telnaes ....................... 463/21
4,618,150 A 10/1986 Kimura
4,695,053 A 9/1987 Vazquez, Jr. et al.
5,205,555 A 4/1993 Hamano
5,332,219 A * 7/1994 Marnell et al. ................ 463/13
5,393,061 A 2/1995 Manship et al.
5,449,173 A 9/1995 Thomas et al.

(Continued)

FOREIGN PATENT DOCUMENTS

EP 0 874 337 A1 10/1998

(Continued)

OTHER PUBLICATIONS

Bonus Spin Advertisement written by IGT, published prior 2000.

(Continued)

*Primary Examiner*—Robert E. Pezzuto
*Assistant Examiner*—Ryan Hsu
(74) *Attorney, Agent, or Firm*—Bell, Boyd & Lloyd LLP

(57) ABSTRACT

A system and method for facilitating participation by a player in a bonus event of a slot machine. A reel configuration associated with the slot machine is presented, and symbols are presented in each of the active reel segments. At least some of the symbols are discontinue symbols which, if presented in an active reel segment, causes that reel segment to be deactivated, thereby eliminating it from the bonus event. The presentation of symbols and subsequent deactivation of symbols associated with discontinue symbols continues until a predetermined number of the active reel segments have been deactivated.

39 Claims, 17 Drawing Sheets

U.S. PATENT DOCUMENTS

| | | | | |
|---|---|---|---|---|
| 5,456,465 | A | 10/1995 | Durham | |
| 5,611,535 | A | 3/1997 | Tiberio | |
| 5,697,843 | A | 12/1997 | Manship et al. | |
| 5,704,835 | A | 1/1998 | Dietz, II | |
| 5,720,662 | A * | 2/1998 | Holmes et al. | 463/20 |
| 5,722,891 | A * | 3/1998 | Inoue | 463/20 |
| 5,725,428 | A | 3/1998 | Achmuller | |
| 5,752,881 | A | 5/1998 | Inoue | |
| 5,788,573 | A | 8/1998 | Baerlocher et al. | |
| 5,823,874 | A * | 10/1998 | Adams | 463/17 |
| 5,833,537 | A * | 11/1998 | Barrie | 463/21 |
| 5,848,932 | A | 12/1998 | Adams | |
| 5,851,148 | A | 12/1998 | Brune et al. | |
| 5,882,261 | A | 3/1999 | Adams | |
| 5,890,962 | A | 4/1999 | Takemoto | |
| 5,911,418 | A | 6/1999 | Adams | |
| 5,927,714 | A | 7/1999 | Kaplan | |
| 5,934,998 | A | 8/1999 | Forte et al. | |
| 5,938,196 | A * | 8/1999 | Antoja | 273/143 C |
| 5,947,820 | A | 9/1999 | Morro et al. | |
| 5,980,384 | A | 11/1999 | Barrie | |
| 5,997,401 | A | 12/1999 | Crawford | |
| 6,004,207 | A | 12/1999 | Wilson, Jr. et al. | |
| 6,004,208 | A | 12/1999 | Takemoto et al. | |
| 6,015,346 | A | 1/2000 | Bennett | |
| 6,033,307 | A | 3/2000 | Vancura et al. | |
| 6,059,658 | A | 5/2000 | Mangano et al. | |
| 6,062,980 | A | 5/2000 | Luciano | |
| 6,089,978 | A | 7/2000 | Adams | |
| 6,095,921 | A | 8/2000 | Walker et al. | |
| 6,102,798 | A | 8/2000 | Bennett | |
| 6,142,873 | A | 11/2000 | Weiss et al. | |
| 6,159,097 | A * | 12/2000 | Gura | 463/20 |
| 6,159,098 | A | 12/2000 | Slomiany et al. | |
| 6,162,121 | A | 12/2000 | Morro et al. | |
| 6,165,071 | A | 12/2000 | Weiss | |
| 6,168,520 | B1 | 1/2001 | Baerlocher et al. | |
| 6,173,955 | B1 | 1/2001 | Perrie et al. | |
| 6,174,235 | B1 * | 1/2001 | Walker et al. | 463/25 |
| 6,186,894 | B1 * | 2/2001 | Mayeroff | 463/20 |
| 6,190,254 | B1 | 2/2001 | Bennett | |
| 6,190,255 | B1 * | 2/2001 | Thomas et al. | 463/20 |
| 6,200,217 | B1 | 3/2001 | Osawa | |
| 6,224,483 | B1 | 5/2001 | Mayeroff | |
| 6,227,971 | B1 | 5/2001 | Weiss | |
| 6,231,442 | B1 | 5/2001 | Mayeroff | |
| 6,234,897 | B1 | 5/2001 | Frohm et al. | |
| 6,270,408 | B1 | 8/2001 | Sakamoto et al. | |
| 6,270,411 | B1 | 8/2001 | Gura et al. | |
| 6,270,412 | B1 | 8/2001 | Crawford et al. | |
| 6,299,165 | B1 | 10/2001 | Nagano | |
| 6,309,300 | B1 | 10/2001 | Glavich | |
| 6,315,660 | B1 | 11/2001 | DeMar et al. | |
| 6,315,663 | B1 | 11/2001 | Sakamoto | |
| 6,319,124 | B1 * | 11/2001 | Baerlocher et al. | 463/20 |
| 6,334,814 | B1 | 1/2002 | Adams | |
| 6,364,768 | B1 | 4/2002 | Acres et al. | |
| 6,398,218 | B1 | 6/2002 | Vancura | |
| 6,461,241 | B1 * | 10/2002 | Webb et al. | 463/20 |
| 6,514,141 | B1 * | 2/2003 | Kaminkow et al. | 463/25 |
| 6,620,044 | B1 * | 9/2003 | Okada | 463/20 |
| 6,634,945 | B2 * | 10/2003 | Glavich et al. | 463/25 |
| 6,648,757 | B1 * | 11/2003 | Slomiany et al. | 463/20 |
| 2002/0049084 | A1 * | 4/2002 | Hughs-Baird et al. | 463/20 |

FOREIGN PATENT DOCUMENTS

| | | |
|---|---|---|
| EP | 0 945 837 A2 | 9/1999 |
| EP | 0 984 409 A2 | 8/2000 |
| WO | 01/12281 | 2/2001 |

OTHER PUBLICATIONS

Double Diamond Run Advertisement written by IGT, published in 2001.
Fortune Cookie Advertisement written by IGT, published in 2001.
Little Devils Advertisement written by IGT, published in 2000.
On the Money Article written by Strictly Slots, published in 2000.
Price is Right Advertisement written by IGT, published in 2001.
Psycho Cash Beast Advertisement written by IGT, published in 1999.
Texas Tea Advertisement written by IGT, published in 2000.
Wheel of Fortune Advertisement written by IGT, published in 1997.
Winning Streak Advertisement written by Aristocrat, published in 1994.
Non-Final Office Action dated Nov. 4, 2002 from U.S. Appl. No. 09/967,266, which issued as U.S. Patent No. 6,634,945, pp. 1-10.
Non-Final Office Action dated May 3, 2004 from U.S. Appl. No. 10/678,512, which issued as U.S. Patent No. 7,014,560, pp. 1-6.
Final Office Action dated Mar. 4, 2005 from U.S. Appl. No. 10/678,512, which issued as U.S. Patent No. 7,014,560, pp. 1-10.
Affidavit of Paulina Rodgers under 37 C.F.R. §1.131 from U.S. Appl. No. 10/678,512, which issued as U.S. Patent No. 7,014,560, pp. 1-20.

* cited by examiner

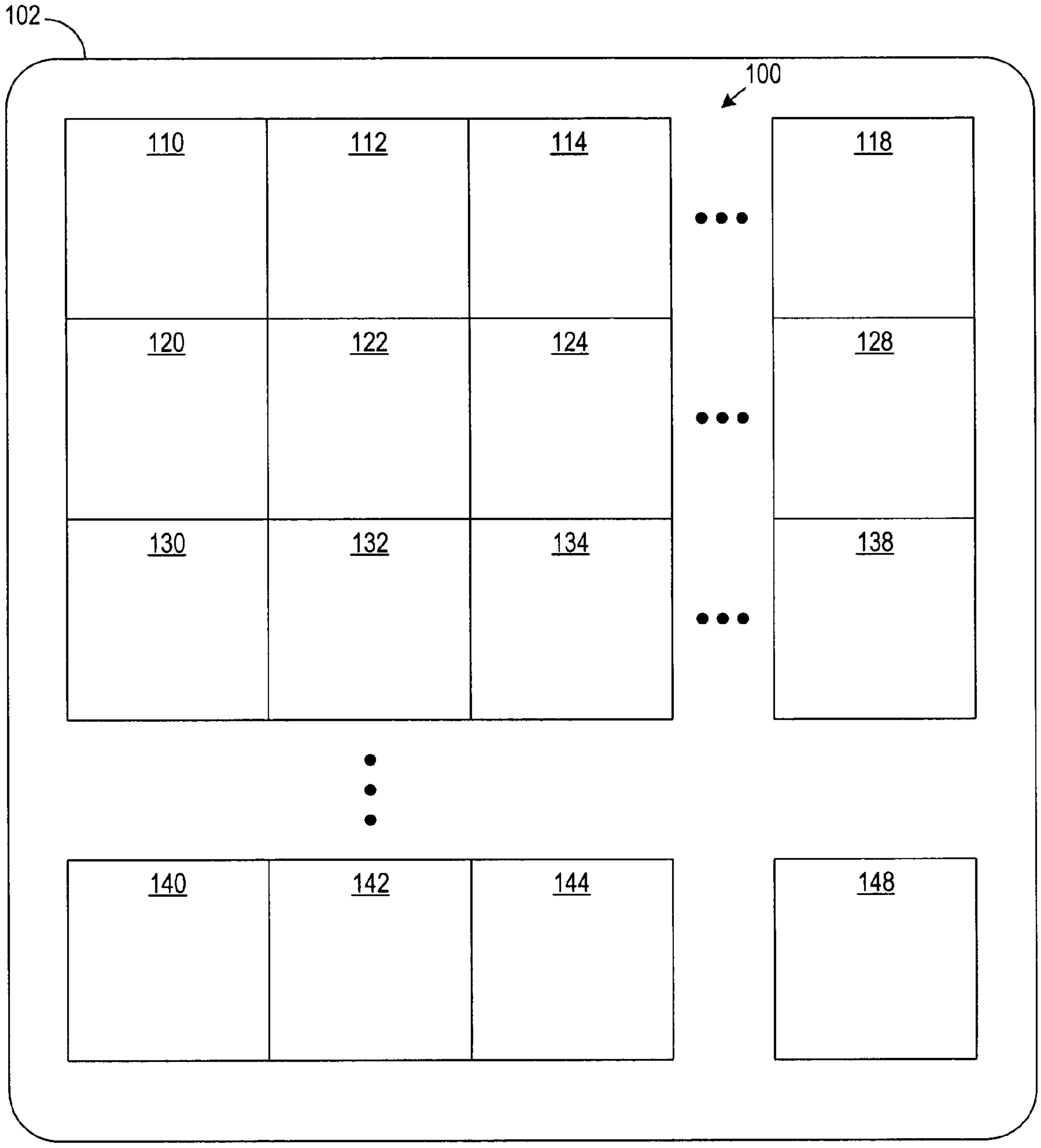
*FIG. 1-A*

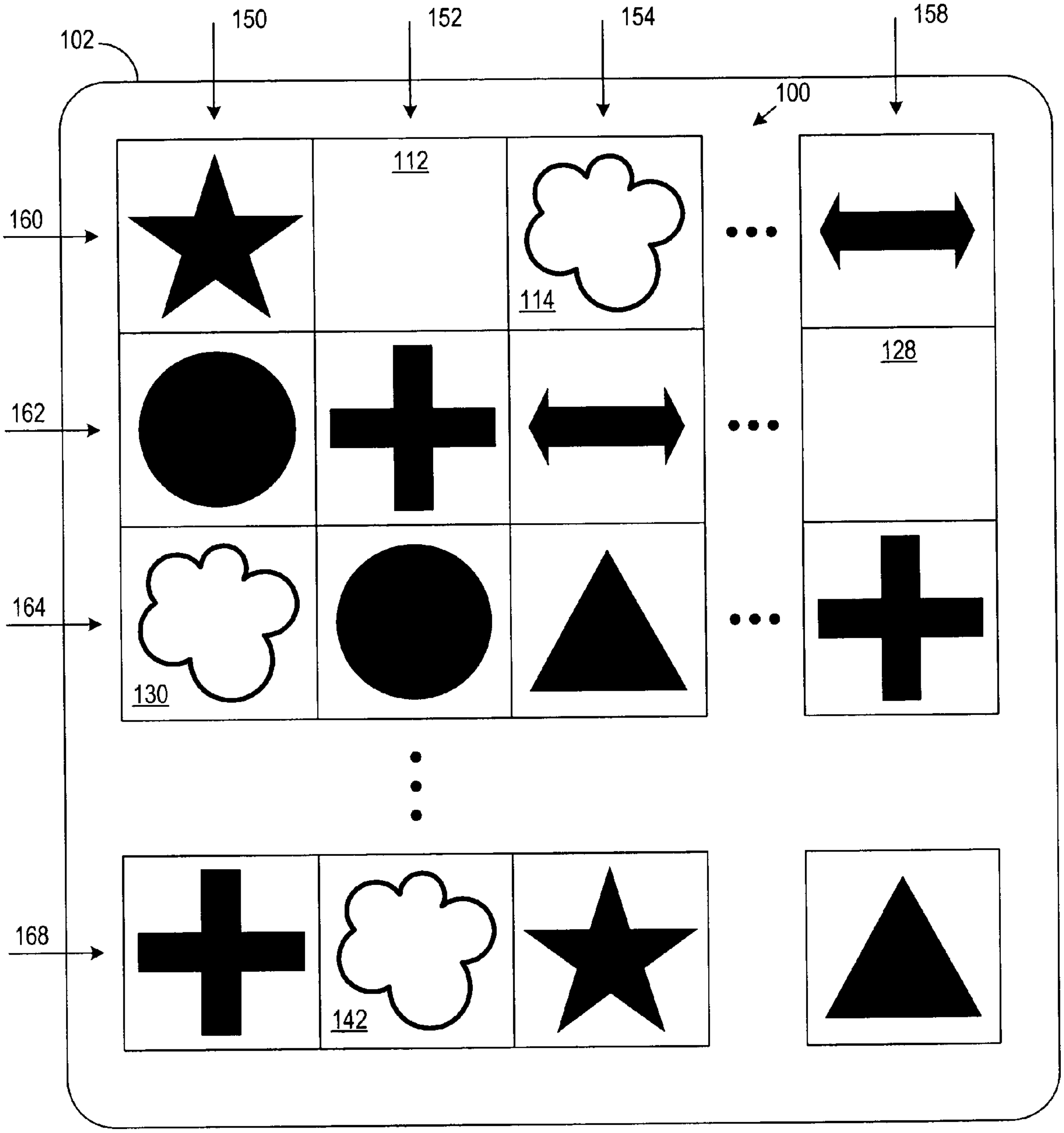
*FIG. 1-B*

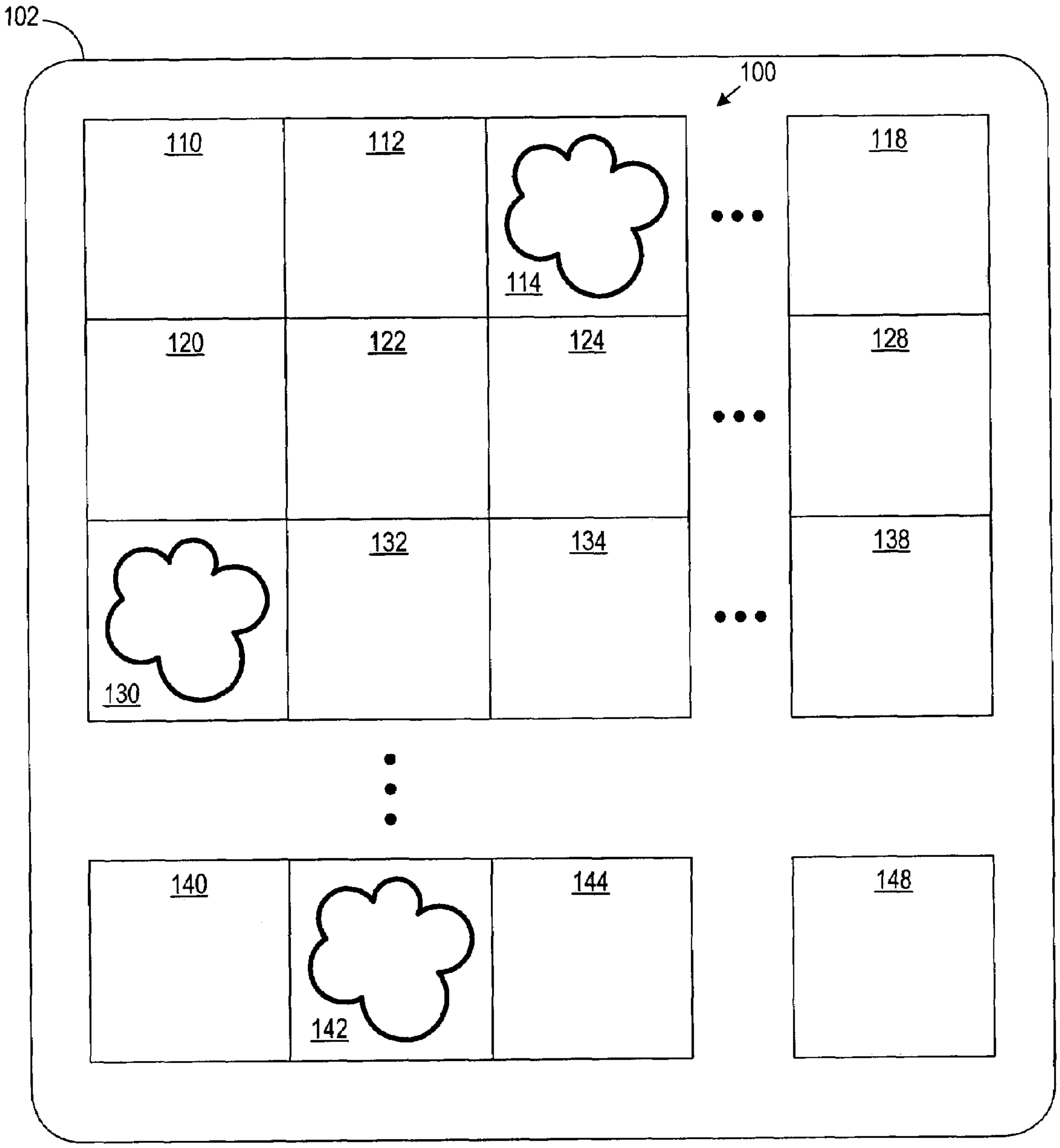
FIG. 1-C

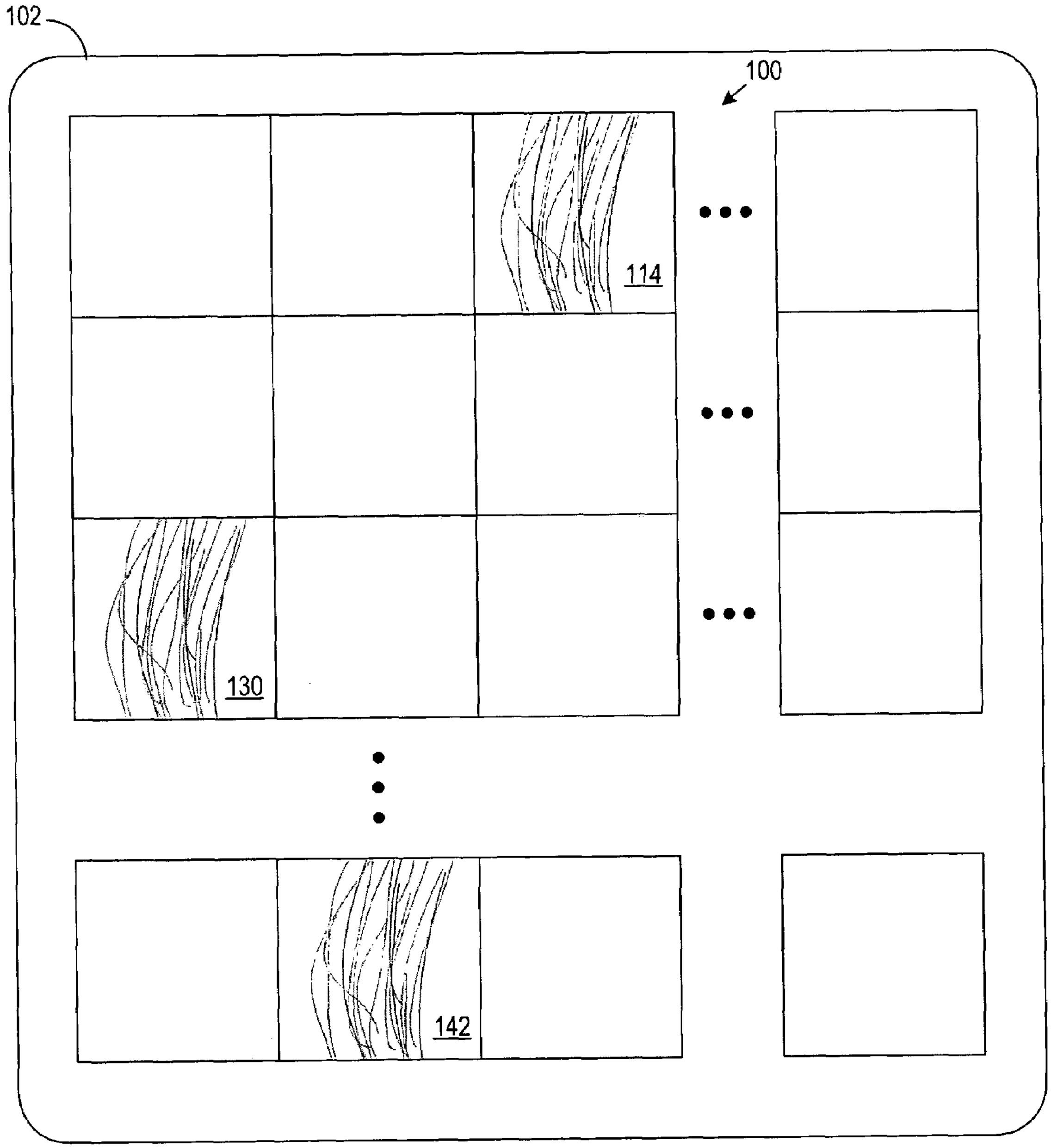
FIG. 1-D

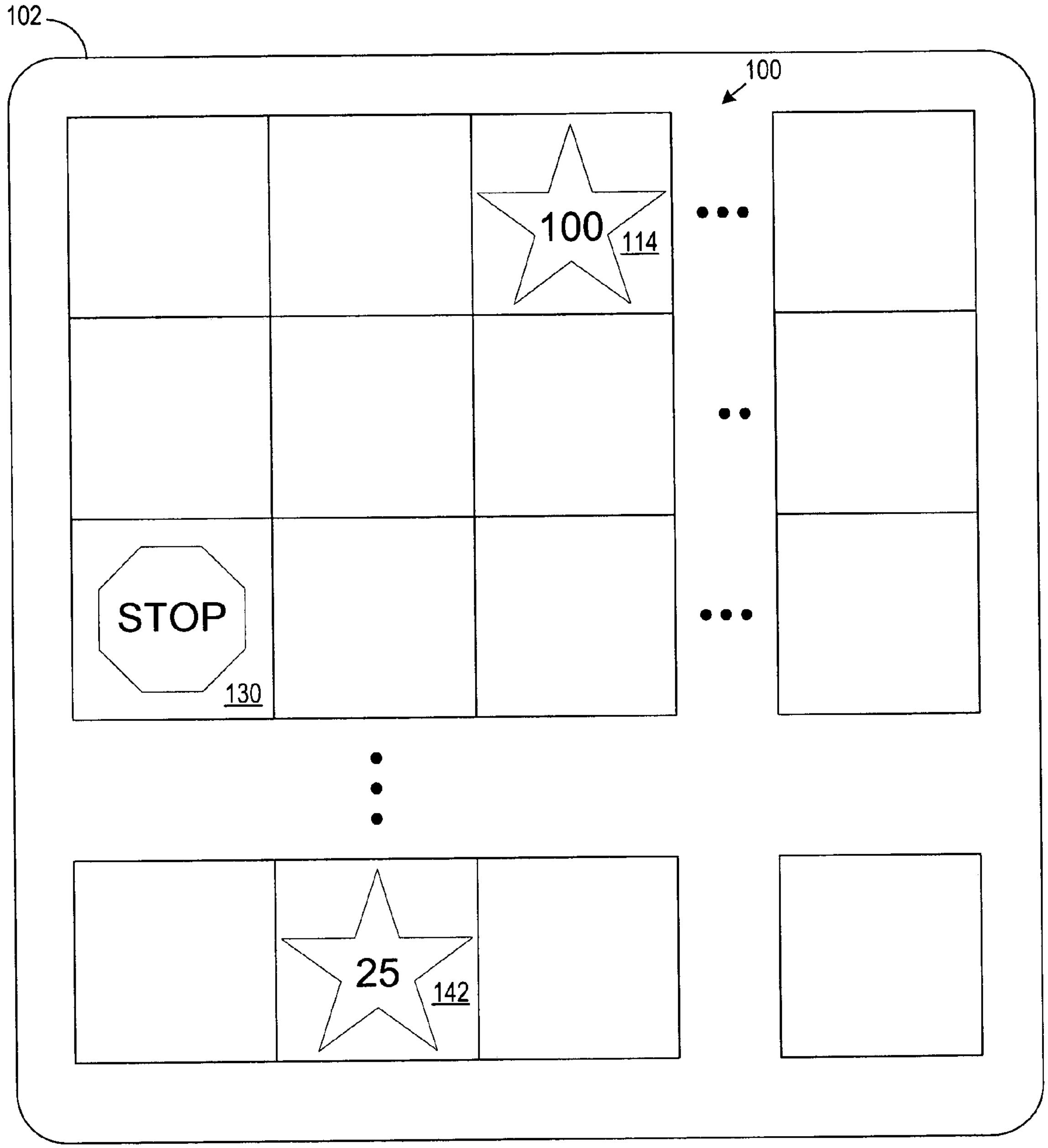
FIG. 1-E

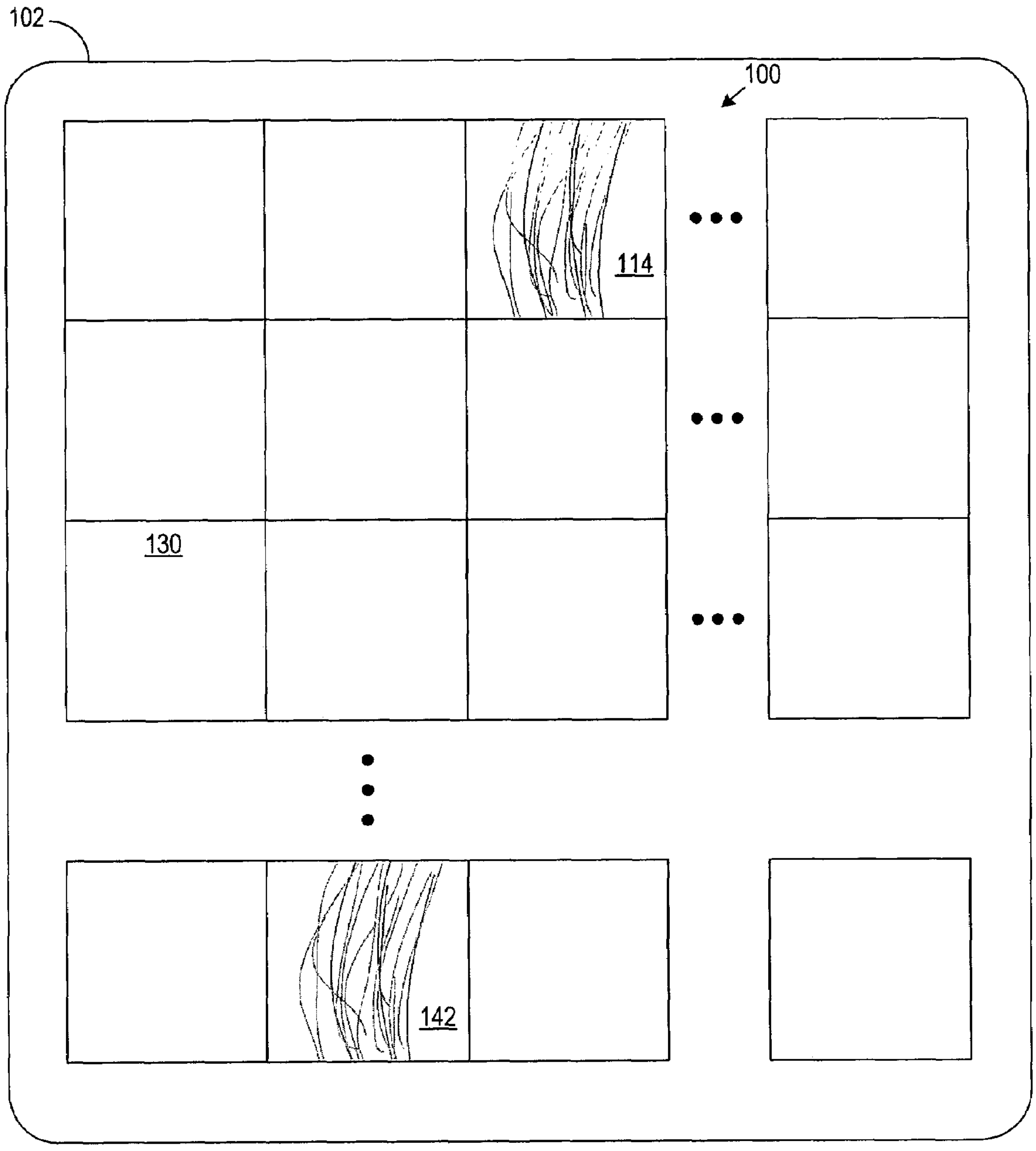
FIG. 1-F

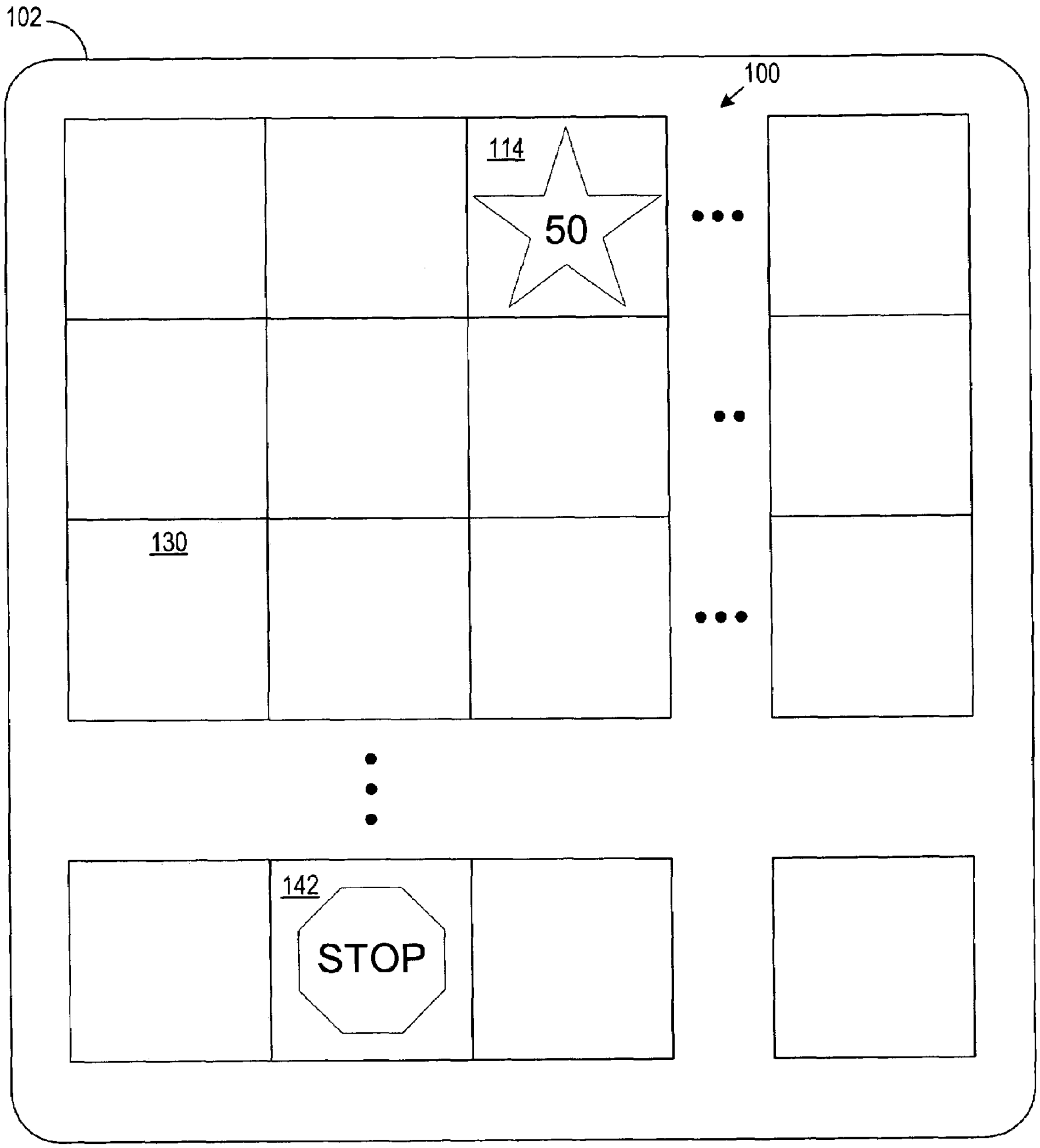
*FIG. 1-G*

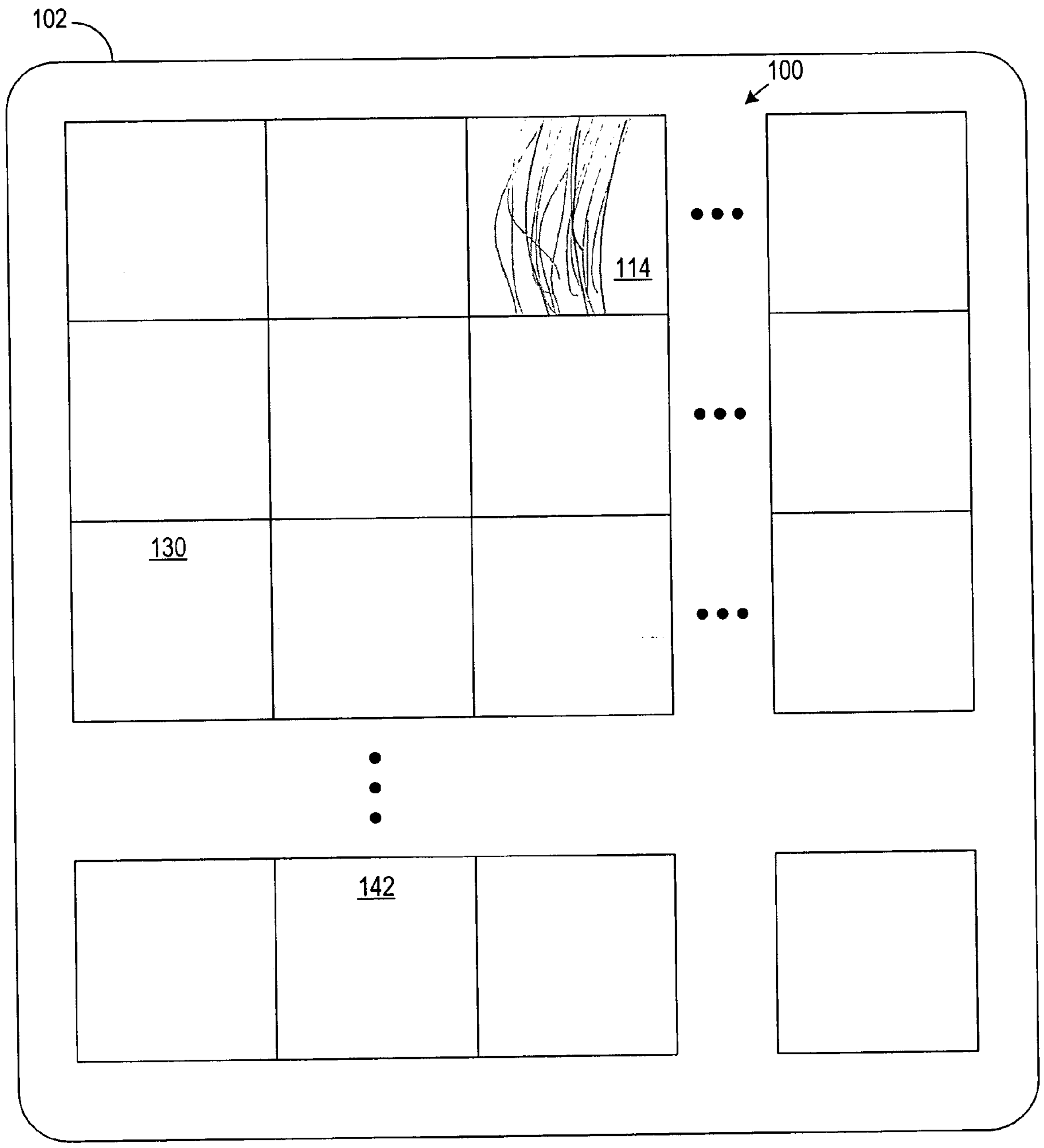
*FIG. 1-H*

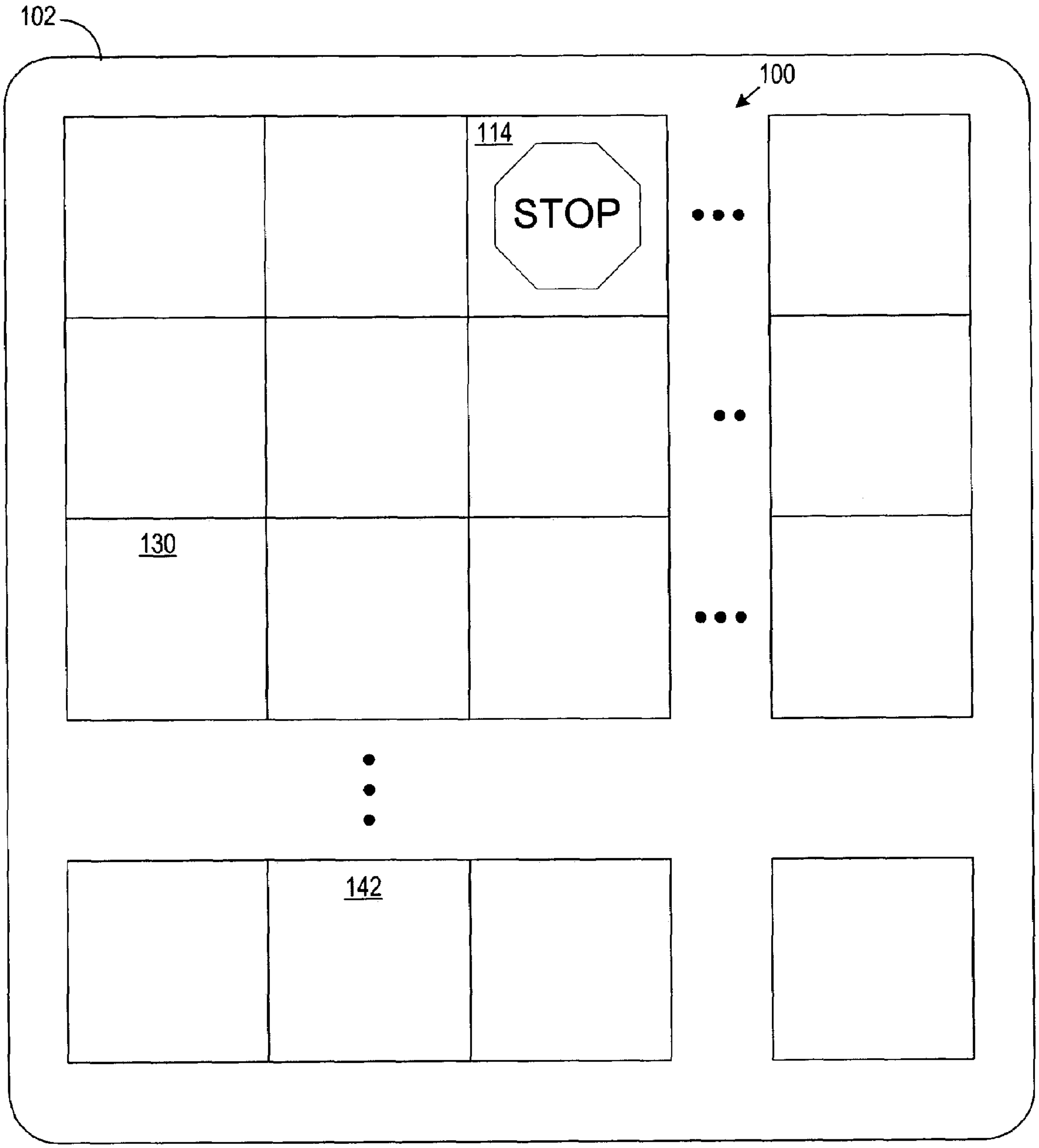
*FIG. 1-I*

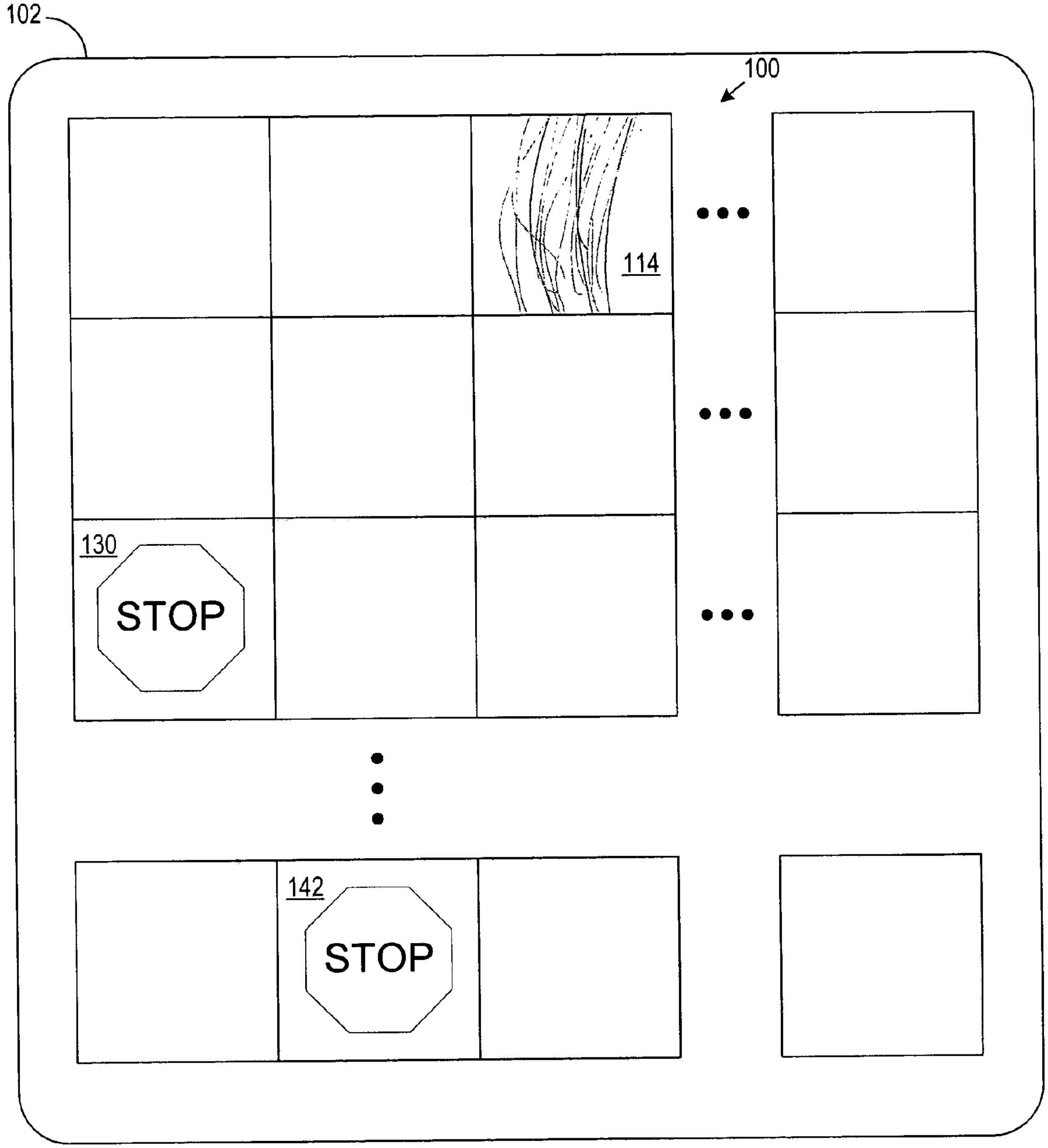
FIG. 1-J

SYSTEM AND METHOD FOR PROVIDING REPEATED ELIMINATION BONUS IN GAMING ACTIVITIES

This is a continuation of application Ser. No. 09/906,283, filed Jul. 16, 2001, now U.S. Pat. No. 6,632,140, the content of which is incorporated herein by reference in its entirety.

FIELD OF THE INVENTION

This invention relates in general to gaming systems and processes, and more particularly to a method and apparatus for providing a gaming activity having one or more independent bonus events in corresponding individual display segments, where the independent bonus events are randomly eliminated from the bonus activity while affording collective accumulation of credits.

BACKGROUND OF THE INVENTION

Gaming devices such as slot machines have been in use in the U.S. for over a century. The earliest slot machines originally paid out in cigars and chewing gum. Remnants of the early slot machines are manifested in the traditional "fruit" symbols such as cherries, lemons, oranges, etc., which represent the original flavors of gum. Notwithstanding the similarity of the symbols and reels associated with the slot machines of both today and yesteryear, modern day slot machine implementations are markedly different than their mechanical ancestors. This dramatic implementation disparity results primarily from the advent of computers and video capabilities.

Pure chance gaming devices such as slot machines have proved wildly popular, and in recent years have rivaled and even surpassed their once untouchable table game counterparts. One reason for this popularity is the increase in innovation, and the recognition of the need for human stimulation. While true that a primary motivator for people to play gaming devices is the chance to win monetary or other prizes (in the case of legalized gambling), the intrigue and excitement of playing these newly created machines lures people as well. It is therefore important in the gaming industry that gaming innovations be rolled out to the participating public.

Conventionally, participation in slot machines involves initiating the rotation of multiple reels, and allowing the machine to randomly stop the reel rotation such that associated reel symbols line up a payline. If the symbols on that payline correspond to a predetermined symbol combination, the participant wins an amount corresponding to the particular symbol combination. For multi-lined paylines, a coin or other token may be played for any one or more of the available paylines, and each of the paylines may provide a winning payout. When this occurs, the slot machine pays out according to the payoff table posted on the slot machine. The payoff table informs players of the winning symbol combinations for that machine, and what each combination pays based on the number of coins allocated for the spin. If a winning combination occurs, the machine releases money or tokens into a payout chute, or may award the winning amount onto a credit meter for the player. For example, if a player initially wagered three coins and that player won a high payout, that player may receive fifty coins of the same denomination in return, or may receive fifty credits for continued play.

It is a continual effort in the gaming industry to develop ways to attract and captivate players in playing gaming machines, such as slot games. One such manner of stimulating interest and heightening excitement has been through the use of "bonus" events. Bonus events or games are used to attract and keep players at a gaming machine. A bonus game is typically an additional gaming reel or machine, or a random selection device, that is enabled by a bonus qualifying signal from an underlying or primary gaming machine. Generally, a predetermined prize-winning combination of symbols in an underlying or primary game may result in the player being awarded one or more bonus games. Often the bonus event has a much higher probability of winning, thereby instilling a great interest by players in being awarded bonus events.

There are various secondary or "bonus" events known in the art. One such bonus event allows the player to depress a bonus spin button to allow the player one or more additional free spins in which a winning payout may be made. Alternatively, additional, discrete bonus reels may be used for the bonus event. In such case, a particular symbol on any one or more of the reels which is stopped on a winning line may result in a winning payout. In some bonus activities, the reels may be controllable in a bonus play, unlike the underlying primary gaming play. For example, the reels may be individually stopped, and/or the reels may be rotated slower to allow the player to attempt to stop the reel such that the prize-winning symbol stops on the win line. In another example, a bonus event for a video slot machine may have a second screen where the player is rewarded with a bonus game, such as allowing the player to pick one of five different items on the second screen, and the selected item reveals a value won by the player. In recent times, bonus events have become quite extravagant, sometimes leading the player through video animations that provide visual and audio entertainment while providing clever ways in which the participant can receive payouts of varying quantities. After engaging in the bonus event, play resumes in the underlying, primary gaming machine.

Of these different types of bonus activities, one type includes those bonus activities where the participant is allowed to actively participate in the bonus event. For example, participants may be allowed to make some sort of selection in order to make the participant feel as though he or she has in some way contributed to the ultimate result. While this may be desirable for some participants, others are more intrigued by the random nature of gaming devices, and may seek an exciting manner of engaging in bonus activities without having to figure out how to best play such a bonus round. This participant sentiment may become increasingly prevalent where the bonus activity is entirely different from the original, standard play of the game. For example, a standard slot machine may have a bonus activity where an animated series of events takes place, and the participant must try to figure out how to effectively play the bonus round. As some bonus activities become more and more elaborate, some participants may be put off by the inherent complexities.

Another problem with prior art bonus activities is that there is conventionally an understood "end" of the bonus activity that is sure to occur. For example, in a bonus round where a participant is allowed to select six of twenty-four hidden bonus amounts, the bonus round ends when the amounts associated with the six selections have been made and credited to the participant. While it may be exciting for the participant to engage in such a bonus round, it is largely due to the participant's knowledge that the bonus round is likely to produce greater payout amounts than during standard play. However, it would be desirable in the gaming industry to provide bonus activity that is terminated based on random events, where although statistically bound, can theoretically continue indefinitely.

The present invention recognizes the strong desirability of bonus activities in today's gaming industry, and addresses the aforementioned and other concerns and shortcomings of present bonus activities. The present invention provides gaming participants with an intelligible gaming bonus activity, while providing an exciting, visually-appealing activity having a theoretically unlimited potential for credit accumulations.

SUMMARY OF THE INVENTION

To overcome limitations in the prior art described above, and to overcome other limitations that will become apparent upon reading and understanding the present specification, the present invention discloses a method and apparatus for facilitating participation in a gaming system. The present invention provides a slot game event where certain display segments are continually eliminated from the slot game event, by becoming associated with a predetermined one or more "discontinue symbols." Those display segments that are not eliminated in this fashion continue to remain active, and potentially accumulate credits, until they too are eliminated from the slot game event.

In accordance with one embodiment of the invention, a method is provided for facilitating participation by a player in a slot game, such as that provided via a slot machine or computing device. A display grid having a plurality of active display segments is presented. Symbols are presented in each of the active display segments, such as by randomly selecting symbols and displaying a randomly selected symbol in each of the active display segments. Of these symbols, at least some are discontinue symbols, and the display segments that are associated with a discontinue symbol are deactivated. The presentation of symbols and subsequent deactivation of symbols associated with discontinue symbols continues until all of the active display segments have been deactivated.

In more specific embodiments of the invention, the method may be implemented in a bonus mode of the slot game, which may be invoked upon the occurrence of a predetermined symbol combination in a standard mode of the slot game. Display segments not associated with the bonus mode can then be de-emphasized to distinguish the display segments associated with the bonus mode from those that are not. A lesser number than all of the active display segments may be the trigger point where the bonus event terminates. In other specific embodiments, active display segments that are not deactivated due to a discontinue symbol will remain active due to the presence of a continue symbol in those active display segments. Payout amounts may be associated with any one or more of the continue symbols, such that a participant can keep accumulating credits at each of the active display segments as long as they remain active. In other embodiments, even predetermined discontinue symbols may be given a payout amount, but the display segments associated with these discontinue symbols will not be able to accumulate any further credits until an entirely new bonus round is invoked.

Another aspect of the invention involves a casino gaming apparatus hosting a gaming activity having at least a standard mode of operation and a bonus mode of operation. The gaming apparatus includes a video screen to present a display grid having a plurality of display cells. A user interface is provided to allow the player to participate in the standard mode of operation, and in some embodiments in the bonus mode of operation as well. A processor is used to designate a plurality of the display cells as active display cells in response to a predetermined symbol combination occurring during the standard mode of operation. When in the bonus mode of operation, the processor randomly presents symbols in the active display cells, and deactivates the active display cells associated with a discontinue symbol. The processor, whether automatically or initiated by user input, repeats the random presentation of symbols and deactivation of the display cells associated with the discontinue symbols, until all, or alternatively a predetermined number, of the active display cells have been deactivated.

In accordance with another embodiment of the invention, a method is provided for facilitating participation in a slot game on a slot machine. A display grid having multiple display segments is presented. Virtual reels, that are visible via the display segments, are electronically "spun." Each of the virtual reels includes symbols from a collective symbol set. This spinning action of the virtual reels is terminated, resulting in a random presentation of a symbol from the collective symbol set in each of the display segments. If a bonus event is invoked through determining whether a predetermined symbol combination is presented, then the display segments associated with the symbols of the predetermined symbol combination are distinguished from inactive display segments disassociated with the symbols of the predetermined symbol combination. While in bonus mode, a bonus virtual reel is spun in each of the active display segments. This spinning action of the bonus virtual reels is terminated, resulting in a random presentation of bonus symbols in each of the active display segments. Display segments associated with a stop-bonus symbol are deactivated and thereby eliminated from the rest of that bonus event. The bonus virtual reels continue to be spun, and display segments deactivated, until a predetermined number, such as all, of the active display segments have been deactivated. More particular embodiments include providing credit awards for at least some of the symbols presented in the display segments that are not stop-bonus symbols.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

The invention is described in connection with the embodiments illustrated in the following diagrams.

FIGS. 1-A through 1-J illustrate a sequence of events carried out in connection with a slot game in accordance with one embodiment of the invention;

FIG. 1-J illustrates an example where the eliminated display segments retain an image of the stop-bonus symbol that brought about the respective display segment's elimination;

DETAILED DESCRIPTION OF THE ILLUSTRATED EMBODIMENTS

Figure 2:
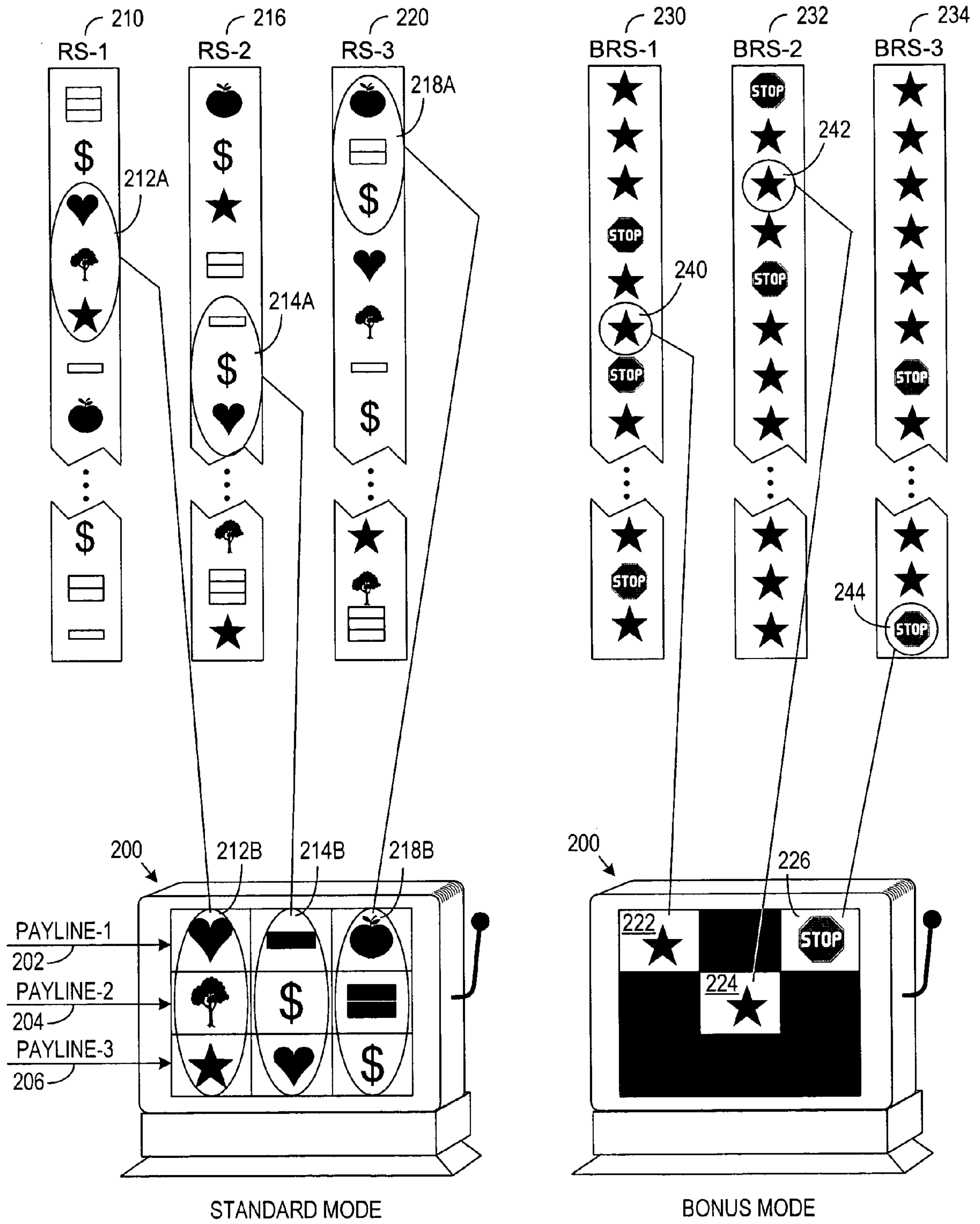
FIG. 2 is a block diagram illustrating one embodiment in which physical or virtual reel strips are associated with a slot game in the standard and bonus modes in accordance with the invention.

In the following description of the invention, reference is made to the accompanying drawings which form a part hereof, and in which is shown by way of illustration the specific embodiment in which the invention may be practiced. It is to be understood that other embodiments may be utilized, as structural and operational changes may be made without departing from the scope of the present invention.

Generally, the present invention is directed to a method and apparatus for facilitating participation in a slot game, such as that played on a slot machine or other computing device. Certain display segments of a display grid are continually eliminated from the slot game event, by becoming associated with a predetermined one or more discontinue symbols. Those display segments that are not eliminated in this fashion continue to remain active, and potentially accumulate credits, until they too are eliminated from the slot game event.

The present invention, as described more fully below, is applicable to a variety of gaming activities that are played on a gaming machine, including slot games such as reel slots and video slots, electronic poker and other electronic card games, keno, bingo, craps, dice, roulette, etc. The present invention is, however, described in large part in the present description in terms of slot machines to provide an understanding of the invention. For example, in the context of slot games/machines, the present invention allows slot game participants to partake in a standard slot game, while having the opportunity to become engaged in a bonus activity according to the present invention. While the invention is particularly advantageous in the context of slot machines, and while a description in terms of slot machines facilitates an understanding of the invention, the invention is equally applicable to other gaming activities of chance as will be readily apparent to those of skill in the art from the description provided herein.

More particularly, an exemplary gaming system in which the principles of the present invention are particularly beneficial includes at least one standard gaming activity, and at least one bonus activity. For example, in the context of slot machines, a standard gaming activity includes the normal slot game in which the participant places a wager, initiates spinning the slot game reels, and collects payouts upon the occurrence of one of a plurality of predetermined winning symbol combinations. A bonus activity is an activity different from the standard gaming activity, which generally only occurs at certain times. In other words, where the standard gaming activity is the gaming activity that is presented to the participant automatically in connection with play of the gaming device, a bonus activity is not automatically presented to the participant. Rather, the bonus activity is generally a special occurrence awarded to the participant for an occurrence resulting from standard gaming play. For example, a bonus event may be awarded to a slot game participant if a resulting symbol combination occurring during standard slot game activity corresponds to a symbol combination determined in advance to result in a bonus event award. Bonus events are typically used to attract and keep players at a gaming machine, and is typically an additional gaming reel or machine, or a random selection device, that is enabled by a bonus qualifying signal from an underlying or primary gaming activity. Generally, a predetermined combination of symbols in an underlying game may result in the player being awarded one or more bonus games. Often the bonus event has a much higher probability of winning, thereby instilling a great interest by players in being awarded bonus events.

As is described more fully below, the present invention provides a repeated bonus activity that, over time, statistically diminishes in potential payout opportunities through individual display segment elimination from the bonus activity. It should be recognized, however, that the principles of the present invention may be utilized in a standard mode of play rather than a bonus mode of play. Those skilled in the art will readily appreciate that the invention may be utilized in a standard mode of play from the description provided herein. While the present invention may be carried out in a standard play mode, an exemplary embodiment of the invention utilizes the present invention in a secondary, or bonus mode, and while embodiments of the invention are largely described herein in connection with such a bonus mode of operation, the invention is not limited thereto.

In order to provide an understanding of the operation of the invention, FIGS. 1-A through 1-J illustrate a sequence of events carried out in connection with a slot machine in accordance with one embodiment of the invention. FIG. 1-A illustrates an example of a slot game grid 100 that may be presented on a slot game display 102. Different slot games may exhibit a variety of different reel characteristics and display formats. For example, some slot games include a conventional three-reel configuration traditionally used in mechanical-reel slot machines. In a three-reel configuration, three reels each having an associated reel strip of symbols rotate vertically as viewed by the participant. The reels stop at random locations, thereby presenting the participant with one, two, or three paylines of potentially winning symbol combinations, depending on the amount wagered by the participant. In more recent times, this traditional reel display format has changed significantly, largely due to the ability to present electronic reels on a display screen. This has resulted in a variety of different reel formats, including greater quantities of vertically rotating electronic reels, greater numbers of paylines, and paylines that are vertical, diagonal, as well as the traditional horizontal paylines. The present invention is applicable with any reel configuration. Therefore, the slot game grid 100 of FIG. 1-A is shown as having an indeterminate number of rows and columns, which can accordingly represent an indeterminate number of reels, paylines, and the like.

The slot game grid 100 of FIG. 1-A includes a number of rows, which may represent different paylines. However, as will be described more fully below, rows do not necessarily correspond to paylines in accordance with the present invention. Each row includes one or more display segments. The first row includes display segments 110, 112, 114, through some predetermined number of display segments represented by display segment 118. Similarly, a second row includes display segments 120, 122, 124 through 128, and a third row includes display segments 130, 132, 134 through 138. Depending on the number of display segments, rows, paylines, etc. desired, additional rows through the final row are provided, where the final row includes display segments 140, 142, 144 through 148. Thus, FIG. 1-A is intended to represent a generic slot game grid having any number or combination of display segments.

Referring now to FIG. 1-B, the slot game grid 100 presented on the display 102 illustrates how symbols ultimately correspond to the display segments. For example, the slot game state represented in FIG. 1-B may include at least four rotating reels (e.g., virtual reels), including the reels corresponding to columns 150, 152, 154 through 158. When the reels randomly come to a stop in accordance with a standard mode of slot game play, slot game symbols are presented in each of the display segments as shown in FIG. 1-B. In some instances, the "symbol" may be a blank symbol as shown in display segments 112 and 128. Each of the various rows 160, 162, 164 through 168 may represent various paylines, where a predetermined combination of symbols in any of the paylines may produce a winning combination and payout during the standard mode of play. Paylines may also be provided in other manners, such as vertically through columns 150, 152, 154 through 158 (particularly where each of the symbols in such columns are not in a predetermined reel strip configuration). Paylines may also be made diagonally, or in some other predetermined pattern. The particular manner in which paylines are formed during a standard mode of play is not of particular importance to the present invention.

In accordance with an exemplary embodiment of the present invention, a predetermined pattern, number of symbols, or other predetermined symbol configuration will initiate a secondary mode of play, referred to herein as a bonus mode of play. The bonus mode can be initiated by a certain symbol combination arising on any of the paylines of the slot game grid 100, or by a certain predetermined symbol combination arising anywhere on the grid 100. In the example of FIG. 1-B, a predetermined symbol combination of three cloud symbols initiates the bonus activity. These three cloud symbols are shown in display segments 114, 130, and 142. It should be noted that any predetermined symbol can initiate the bonus activity, as well as any number of such symbols arising (e.g., one, two, etc.) Again, for purposes of illustration, three cloud symbols trigger the bonus mode in the present example.

When the bonus-triggering symbols are presented during the standard mode of play, the bonus mode is initiated. In accordance with one embodiment of the present invention, the display segments 114, 130, and 142 corresponding to the bonus-triggering symbols become the display segments to be used in the bonus activity. This can be seen in FIG. 1-C, where display segments 114, 130, and 142 remain "active," but the remaining display segments 110, 112, 118, 120, 122, 124, 128, 132, 134, 138, 140, 144, and 148 temporarily become "inactive." In one embodiment of the invention, these inactive display segments are de-emphasized during the bonus mode of play, such as by graying out these display segments or otherwise providing some other visual manner of distinguishing the inactive and active display segments.

The bonus activity according to one embodiment of the invention includes randomly or pseudo-randomly updating the active display segments 114, 130, 142 with bonus symbols that may provide the participant with credits won through the bonus activity. For example, referring to FIG. 1-D, the bonus activity includes individually re-spinning virtual reels in each of the display segments 114, 130, 142. In accordance with one embodiment of the invention, the bonus mode is automatically initiated upon the bonus-triggering event as described in connection with FIG. 1-C. Alternatively, the participant may be notified visually, audibly, or otherwise that the bonus mode is available, thereby prompting the participant to initiate the spinning of the active display segments 114, 130, 142 through a user interface.

The bonus mode according to the present invention utilizes a random number generator (RNG) to randomly (or pseudo-randomly) determine which bonus symbols will be presented in the display segments 114, 130, 142 during the bonus activity. The degree in which the symbols are selected "randomly" may be configured as desired, such as by controlling the degree in which the symbol is randomly selected through desired statistical probability outcomes. FIG. 1-E illustrates the display segments 114, 130, 142 after the display segment "spinning" is stopped pursuant to the RNG. The ultimately resulting symbols that are randomly presented in each of these active display segments may be common to the symbols used during the standard mode of play, or alternatively may be a different set of symbols used just during the bonus mode of play. In the illustrated embodiment, the bonus symbols are different than those used in the standard mode of play, and include stop-bonus symbols such as the stop-sign symbol in display segment 130, as well as continue-bonus symbols such as the star symbols in display segments 114 and 142.

The continue-bonus symbols associated with display segments 114 and 142 result in continued bonus activity at these display segments. An amount value, corresponding to a number of coins or credits won, may be displayed in connection with the continue-bonus symbols. For example, the star continue-bonus symbol at display segment 114 indicates that one hundred credits were randomly awarded, and the star continue-bonus symbol at the display segment 142 indicates that twenty-five credits were awarded. Thus, this particular bonus round of the entire bonus activity resulted in a total of one hundred and twenty-five credits being awarded to the participant. The continue-bonus symbols may be associated with positive credit/coin awards, i.e., a credit award greater than zero. Alternatively, the continue-bonus symbols may be associated with no credits/coins (i.e., a null credit award), but that display segment will remain active for further bonus activity. In another embodiment, the continue-bonus symbols may even be associated with negative credits, such that credit accumulations are taken away from the participant, although the display segment will remain active for anticipated further credit accumulations. In still further embodiments, a plurality of matching continue-bonus symbols may be required in order to obtain a particular credit value.

Each time a continue-bonus symbol is presented during the bonus activity, whether or not associated with a credit/coin award, the corresponding display segment remains active, resulting in further chances to accumulate credits/coins via that display segment. On the other hand, stop-bonus symbols such as the stop symbol in display segment 130 are deactivated, and therefore eliminated from further activity during this particular round of play. As will be described in greater detail, the bonus mode according to the present invention may theoretically continue indefinitely, as the random selection of continue-bonus symbols can repeatedly be presented in the display segments during the bonus mode. Thus, there is no scheduled end to the bonus round, but rather, the bonus activity ends when all active display segments have been eliminated from the bonus round through deactivation of the corresponding display segments upon random receipt of a stop-bonus (i.e., discontinue) symbol. This is described in greater detail in FIGS. 1-F through 1-J below.

Referring next to FIG. 1-F, the non-eliminated, active display segments 114, 142 re-spin due to a continue-bonus symbol having been previously associated with these display segments. Display segment 130, on the other hand, has been de-emphasized due to its earlier elimination resulting from the stop-bonus symbol being presented in display segment 130. It should be noted that in one embodiment of the invention, one or more of the active display segments 114, 142 having a continue-bonus symbol may be "held" for use in the next spin.

Upon completion of the spinning of the remaining display segments 114, 142, a random symbol presentation is presented in the active display segments 114, 142 as shown in FIG. 1-G. In this example, the ultimately resulting bonus symbols that are randomly presented in these active display segments include a continue-bonus symbol (e.g., star symbol) in display segment 114, and a stop-bonus symbol (e.g., stop-sign symbol) in display segment 142. In the illustrated example, the continue-bonus symbol at display segment 114 has an associated credit award of fifty credits, thereby adding an additional fifty credits to the participant's accumulated credit total. As previously described, display segment 114 remains active for further bonus activity due to its association with a continue-bonus symbol. On the other hand, the stop-bonus symbol associated with display segment 142 results in display segment 142 being deactivated and eliminated from further bonus activity. It should be recognized that stop-bonus symbols, as with continue-bonus symbols, may be associated with a credit award even though the associated display segment is eliminated from further involvement with that particular bonus activity.

This process of repeatedly eliminating the availability of display segments during the bonus activity continues, as shown in FIG. 1-H. FIG. 1-H shows that the remaining active display segments, display segment 114 in this example, again provide a random selection process of a new bonus symbol, as illustrated by the display segment spinning action of display segment 114. The previously-eliminated display segment 142 is optionally de-emphasized. When a bonus symbol has been randomly selected, it is presented in display segment 114 as shown in FIG. 1-I. In this example, the bonus symbol is, by random chance, a stop-bonus symbol. However, the symbol could have been a continue-bonus symbol, thereby awarding the participant with any associated credit value, and maintaining the display segment 114 as an active display segment. Because of the random nature of the presentation of continue-bonus and stop-bonus symbols, the bonus activity has no set termination. However, in other embodiments of the invention, a maximum number of spins or other termination point may be defined.

The display segments that have been eliminated from the bonus activity may be, as previously described, de-emphasized, as the original inactive display segments were. Alternatively, the display segments that have been eliminated from the bonus activity may retain a visual cue to identify that display segment as a once-active display segment associated with the bonus activity. FIG. 1-J illustrates such an example, where the elimination of display segments 130, 142 retain an image of the stop-bonus symbol that brought about the respective display segment's elimination. Other images can alternatively be provided in these eliminated display segments as well.

It should be noted that any predetermined number of symbols, in any predetermined arrangement, can be used to initiate the bonus activity in accordance with the invention. Further, an exemplary embodiment of the invention utilizes the same display segments for purposes of the bonus round that initially gave rise to the bonus round. For example, display segments 114, 130, and 142 initially gave rise to the bonus round in the example of FIGS. 1-A through 1-I, and these same display segments were therefore used in the bonus activity. Alternatively, a different display segment arrangement could be used for the bonus round, but implementing the repeated elimination process described above. Thus, once the bonus activity is initiated, any predetermined arrangement and/or number of display segments could be used in the elimination bonus activity described herein. For example, even where the display segments 114, 130, 142 originally give rise to the bonus activity, an alternative embodiment includes utilizing, for example, the top row 160 of the slot game grid as the relevant display segments.

In one embodiment of the invention, the standard mode of play may implement a first set of physical or electronic (e.g., virtual) reel strips, and the bonus mode of play may implement a different set of reel strips, where each reel strip provides a symbol set. Further, the standard mode of play may implement physical or virtual reel strips where multiple sequential symbols of the reel strip is provided on multiple paylines during the standard mode of play. For example, referring to FIG. 2, a slot machine 200 is shown in the standard mode of play. In this example, the standard mode includes three paylines, shown as payline-1 202, payline-2 204, and payline-3 206. The reel strips associated with the standard mode of play may be provided as physical strips having symbols imprinted thereon, such that the stopping point of the reel strip determines which symbols will fall on the paylines 202, 204, 206. For example, a first reel strip, RS-1 210 includes a series of symbols. This reel strip, when stopped, presents a group of symbols on the paylines 202, 204, 206. More particularly, the symbol group 212A is presented across payline-1 202, payline-2 204, and payline-3 206 as seen on the slot machine 200 as symbol group 212B. Analogously, the symbol group 214A of RS-2 216 is presented across paylines 202, 204, 206 as symbol group 214B on the slot machine 200; and the symbol group 218A of RS-3 220 is presented across paylines 202, 204, 206 as symbol group 218B on the slot machine 200. The same may hold true for virtual reel strips, where the order of the symbols on the virtual reel strip may be carried over to the order of the symbols presented across the paylines.

The operation of the reel strips, whether physical or virtual, may change in accordance with one embodiment of the invention. As shown in FIG. 2, the slot machine 200 de-emphasizes those display segments that are not "active" when entering the bonus mode of play. Three display segments 222, 224, and 226 remain active in this example. The same reel strips used during standard play may be used in the bonus mode, however, in the illustrated embodiment a new set of bonus reel strips BRS-1 230, BRS-2 232, and BRS-3 234 are used. In the bonus mode, one embodiment of the invention involves providing a reel strip 230, 232, 234 for each of the individual display segments 222, 224, 226 that is active in the bonus mode of play. Thus, bonus reel strip BRS-1 230 will "spin" in display segment 222, bonus reel strip BRS-2 232 will spin in display segment 224, and bonus reel strip BRS-3 234 will spin in display segment 226. In this manner, each of the individual active display segments 222, 224, 226 operates as a discrete, self-sufficient bonus payline. As can be seen, a single symbol such as continue-bonus symbols 240 and 242 from bonus reel strips 230 and 232 respectively may ultimately be presented in display segments 222 and 224. Similarly, a stop-bonus symbol 244 from bonus reel strip 234 may ultimately be presented in display segment 226.

It should be noted that the particular reel strips, number of symbols, and type of symbols presented on the reel strips 230, 232, 234 may differ from one embodiment to the next. For example, each of the reel strips can include a different symbol set altogether, rather than having symbols from a common symbol set such as illustrated in FIG. 2. Further, the symbols associated with any of the reel strips may change. For example, after each "spin" in the bonus mode one or more of the reel strips can change symbols, add symbols, remove symbols, etc. In a more particular example, each time a display segment has a continue-bonus symbol associated therewith, one or more of the continue-bonus symbols on that reel strip may be removed, to raise the chance that a stop-bonus symbol will occur.

During bonus mode, the active display segments, such as display segments 222, 224, and 226, thus operate as individual paylines in one embodiment of the invention. In alternative embodiments, two or more active display segments may present symbols from a common reel strip. For example, in the case of electronic reel strips requiring no physical relationship between the symbols, the single bonus reel strip 230 may provide the symbols for each of the display segments 222, 224, and 226 during the bonus activity. However, in such case, each of the active display segments 222, 224, 226 would appear, and spin, as individual paylines. Therefore, such an embodiment is best suited for video display segments where the reel strip is a "virtual" reel strip generated electronically, and therefore does not require an actual, physical reel strip.

As described above, one embodiment of the invention involves operating each of the "active" display segments individually such that the resulting symbol in each active display segment is not reliant on symbols in other display segments to determine a winning result. For example, a star symbol in active display segment 222 by itself may generate a winning payout, where the stop symbol in active display segment 226 by itself may cause that particular display segment to be eliminated from the bonus activity. In such an embodiment, the symbol presented in the active display segment provides all the information necessary to determine whether that display segment will continue to be active, whether it will provide a payout amount, or whether that display segment will become inactive due to its elimination. Other actions may also be taken from these single symbols, as different symbols may represent different actions. One such example is that a certain symbol causes an auxiliary action, such as doubling the payout of another continue-symbol in another display element presented during bonus mode.

Although the active display elements operate as individual paylines, the collection of active display elements create a "bonus group" of active display elements. The active display elements 222, 224, and 226 may thus be considered as an active bonus group, which remains operative in the bonus mode of play until all of the individual display segments of the bonus group have been eliminated.

FIGS. 3-A and 3-B provide a more particular example of the elimination bonus methodology in accordance with the invention. In this example, a video display screen 300 is provided. The video display screen may be implemented in a variety of manners, including electronically represented with outputs shown on conventional electronic displays, such as a liquid crystal displays (LCD), dot matrix, plasma, CRT, LED, electro-luminescent display, or generally any type of video display known in the art.

The display screen of the illustrated embodiment includes a grid 301 comprised of a plurality of video display segments. In one embodiment, the grid includes five virtual reels 302, 304, 306, 308, and 310 that rotate vertically. However, in a video display environment, the electronic reels need not rotate vertically, but may rotate horizontally along rows, or each display segment may rotate independently of other display segments. In this example it is assumed that the electronic reels rotate vertically and in groups defined by reels 302, 304, 306, 308, and 310.

In the standard mode of play, the reels 302, 304, 306, 308, and 310 are electronically rotated. The reels are randomly stopped pursuant to operation of a random number generator (RNG) or other random operation engine. Winning symbol combinations may be presented along a number of different paylines. The example of FIG. 3A includes five paylines, shown as payline-1 320, payline-2 322, payline-3 324, payline-4 326, and payline-5 328. Additional paylines could be implemented, such as along columns, particularly where the standard mode of play randomly selects symbols at each display segment rather than providing a continuous reel strip for each column. In this example, payline-1 320 includes display segments 330, 332, 334, 336, and 338. Payline-2 322 includes display segments 340, 342, 344, 346, and 348. Payline-3 324 includes display segments 350, 352, 354, 356, and 358. Payline-4 326 includes display segments 330, 342, 354, 346, and 338. Finally, payline-5 328 includes display segments 350, 342, 334, 346, and 358.

While the participant may win credits by obtaining predetermined symbol combinations along paylines 320, 322, 324, 326, 328 during the standard mode of play, the present invention also includes a bonus mode of play. Any predetermined symbol criteria may be used to invoke the bonus mode of play. For example, the criteria may be one or more predetermined symbols stopping at predetermined locations in the display segment grid 301. An example is at least one predetermined symbol stopping in each of the reels 302, 304, 306, 308, 310. Another exemplary criteria is a predetermined number of a predetermined symbol, regardless of where on the grid 301 these predetermined symbols present themselves. For example, the criteria may be that three star symbols present themselves on the grid 301, and if at least three star symbols present themselves, they become the "bonus group" used in the bonus mode of play. As will be readily apparent to those skilled in the art from the foregoing description, a wide variety of options may be implemented to invoke the bonus mode in accordance with the invention.

Figure 3A:
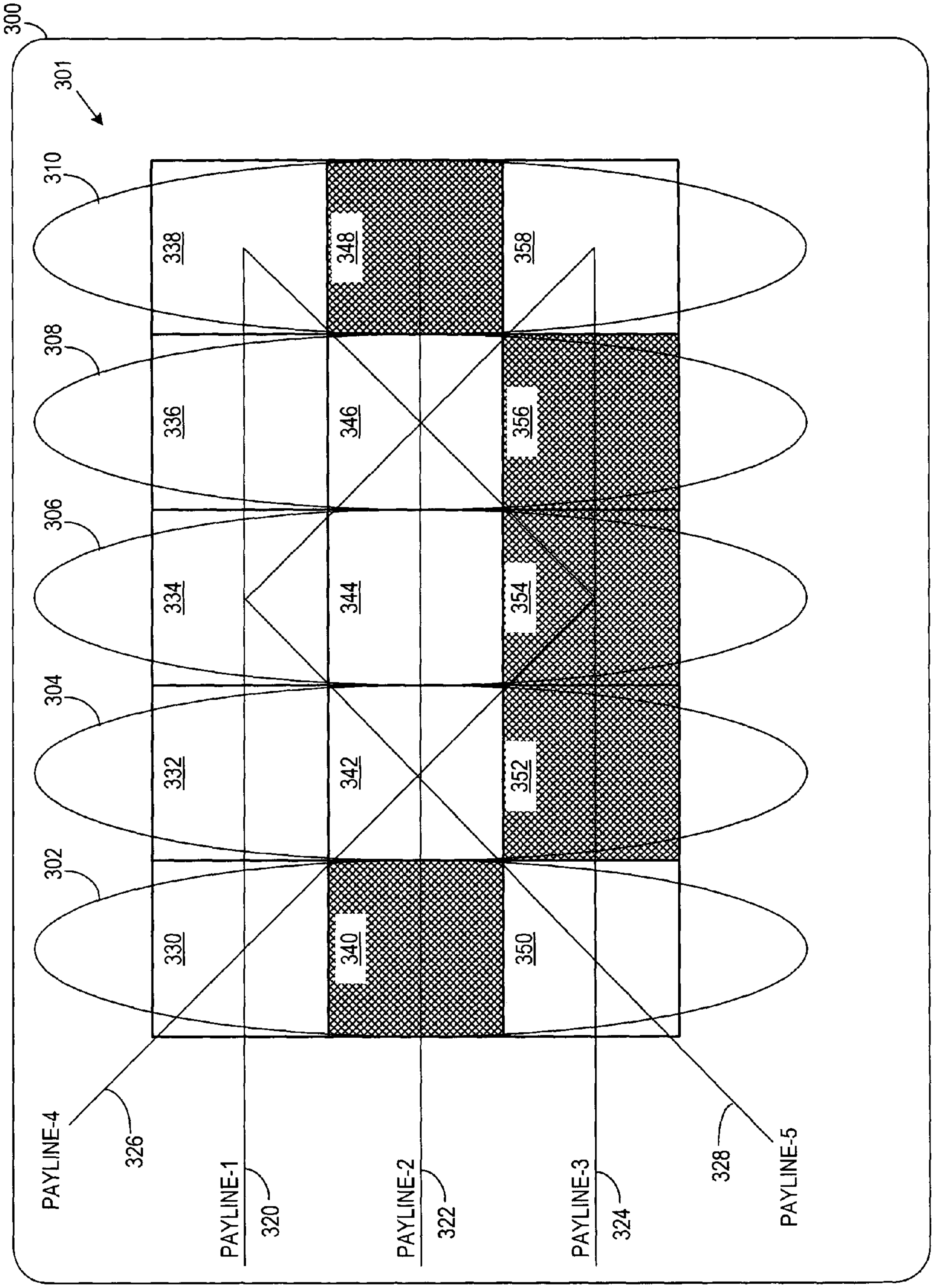
FIGS. 3-A and 3-B illustrate an exemplary embodiment of the elimination bonus methodology used in connection with a video display device in accordance with the invention.

For purposes of discussion, it is assumed that the criteria used in invoke the bonus mode is that a predetermined symbol must present itself in each of the reels 302, 304, 306, 308, 310. The example of FIG. 3A illustrates that such predetermined symbols presented themselves during standard play at display segments 340, 352, 354, 356, and 348. This invokes the bonus mode of play.

Figure 3B:
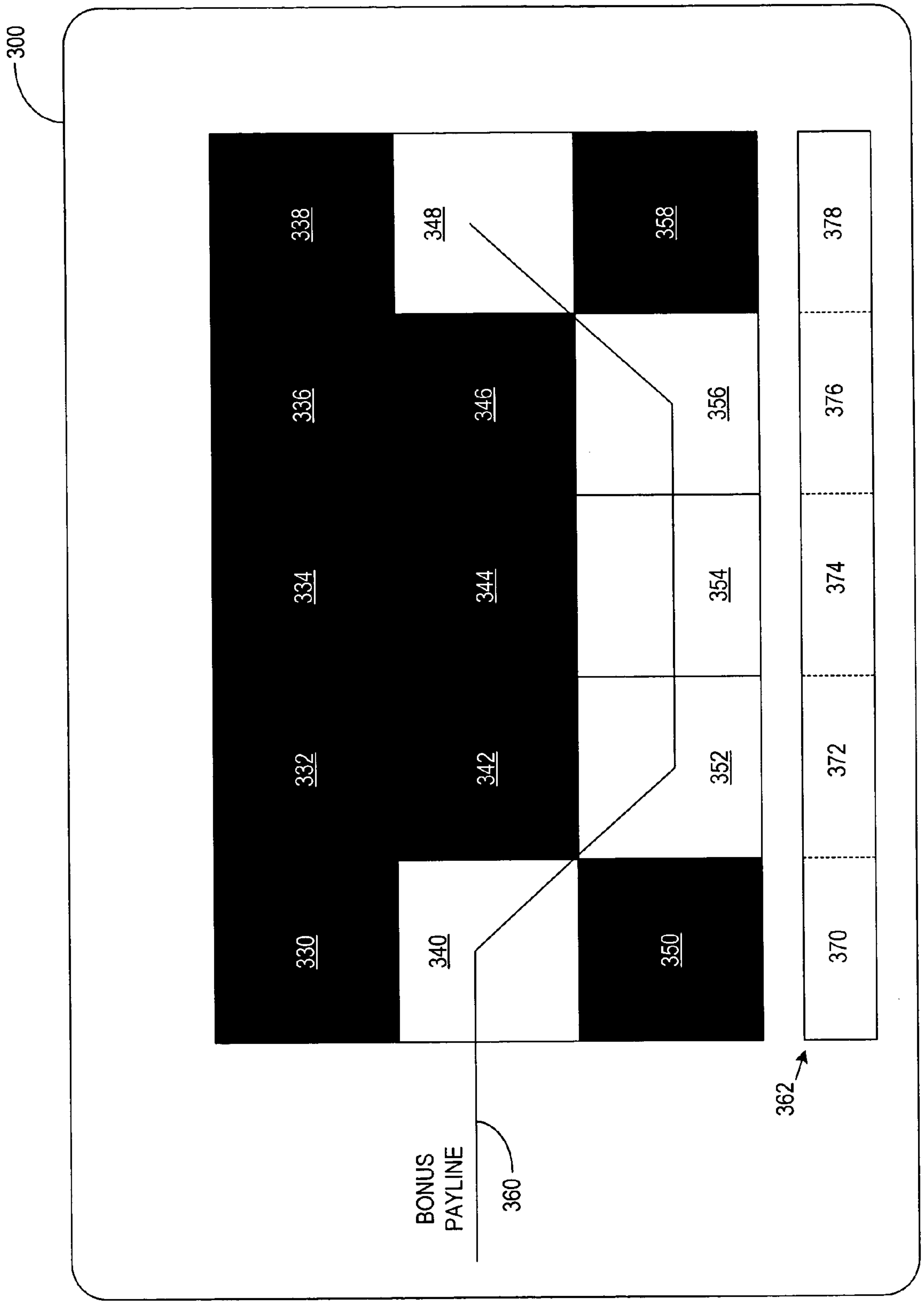

FIG. 3B illustrates an exemplary embodiment of the display screen 300 when the bonus mode is invoked. In this embodiment, all display segments 340, 352, 354, 356, 348 in which the predetermined symbol was presented during standard play become the active display segments of the bonus group 360 in the bonus mode of play. In one embodiment, the remaining display segments are de-emphasized or otherwise distinguished from the bonus group as shown in FIG. 3B. At this point, the bonus activity may automatically begin, or alternatively may be initiated by the participant via a user interface. The bonus activity then continues as previously described in connection with FIGS. 1-A through 1-I.

The display screen 300 also includes a bonus payout bar 362. The bonus payout bar 362 provides payout subtotals of predetermined active display segments of the bonus group 360. In the illustrated example, the bonus payout bar 362 is configured to provide payout subtotals for each active display segment, such that bonus payout bar sections 370, 372, 374, 376, and 378 provide subtotal payout accumulations for display segments 340, 352, 354, 356, and 348 respectively. For example, if display segment 340 produces three continue-bonus symbols each having a payout value of twenty-five during three rounds of bonus activity, the bonus payout bar section 370 will reflect a subtotal accumulation of seventy-five credits. This subtotal accumulation will continue until each of the display segments of the entire bonus group has been eliminated through stop-bonus symbols.

Figure 4:
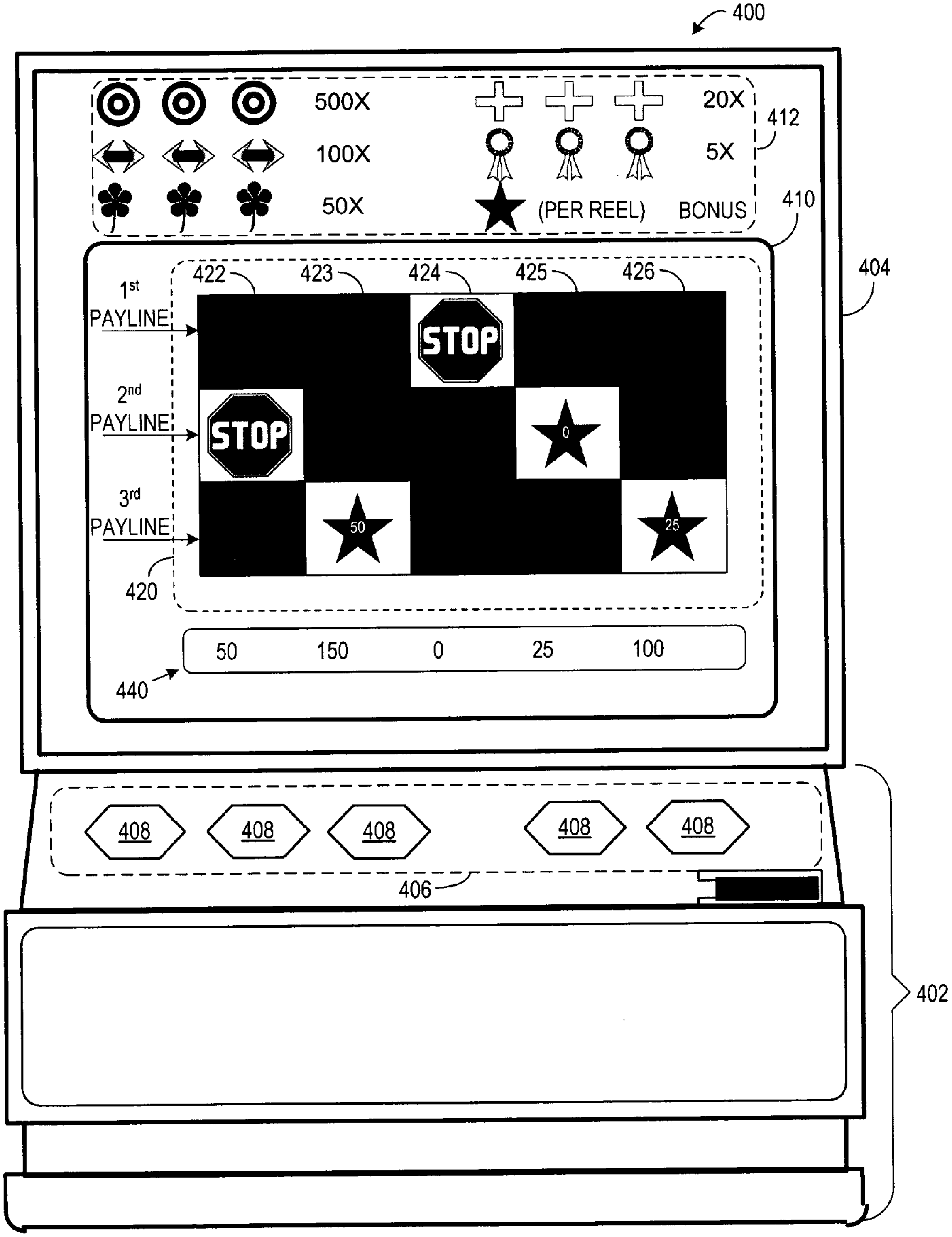
FIG. 4 is an embodiment of a casino-style gaming device in which the principles of the present invention may be applied.

FIG. 4 is an embodiment of a casino-style gaming device in which the principles of the present invention may be applied. Many traditional casino table games may be provided in a "video game" available via a casino-style gaming device shown in FIG. 4. For purposes of explanation, the description of the gaming device is FIG. 4 is provided in terms of a slot machine 400. However, the present invention is analogously applicable to other casino-style games having the ability to include at least one bonus activity.

The slot machine 400 is a structure including at least a computing system, a housing, and a display. The housing includes a base 402 and a display device 404 to allow the slot machine 400 to be a self-supported, independent structure. The base 402 includes structure supporting the slot machine 400, and also includes a user interface 406 to allow the user to control and engage in play of the slot machine 400. The particular user interface mechanisms associated with user interface 406 is dependent on the type of gaming machine. For example, the user interface 406 may include one or more buttons, switches, joysticks, levers, pull-down handles, trackballs, voice-activated input, or any other user input system or mechanism that allows the user to play the particular gaming activity. The user input 406 allows the user to enter coins or otherwise obtain credits through vouchers, tokens, credit cards, etc. Various mechanisms for entering such vouchers, tokens, credit cards, coins, etc. are known in the art. For example, coin/token input mechanisms, card readers, credit card readers, smart card readers, punch card readers, and other mechanisms may be used to enter wagers. It is through the user input 406 that the user can initiate the standard mode of play, and may optionally control certain aspects of the bonus mode of play. In the case of a slot machine, the user input may include a plurality of buttons, e.g., button 408, which allow the user to enter a number of credits to play, identify the number of paylines in which to participate, cash out, automatically bet the maximum amount and paylines, etc. It should be recognized that a wide variety of other user interface options are available for use in connection with the present invention, including pressing a button on a gaming machine, touching a segment of a touch-screen, entering text, entering voice commands, or other known user entry methodology. The particular user interface mechanism employed is not relevant to the present invention.

The display device 404 includes a display screen 410. The display device may take on a variety of forms depending on what type of presentation is to be provided. For example, a slot game area 420 is provided where the standard slot gaming activity is displayed. In this example, the standard slot gaming activity includes five video reels 422, 423, 424, 425, and 426, and three paylines depicted as the $1^{st}$ payline 428, the $2^{nd}$ payline 430, and the $3^{rd}$ payline 432. The display segments occur at the intersections of each video reel and payline. Another presentation that may be displayed on the display screen 410 is the bonus payout bar 440, which may optionally be displayed only during the bonus mode of play.

Also associated with the display device 404 is an optional winning guide area 412, where information associated with the potential winning symbol combinations of the standard slot game activity may be presented. This area may also provide an indication of the requisite symbols, symbol combinations, symbol locations, etc. that are required to invoke the bonus mode in accordance with the invention. This information may be part of the display screen 410, or alternatively may be separate from the display screen 410 and provided directly on a portion of the display device 404 structure itself. For example, a backlit colored panel may be used as the winning guide area 412.

Figure 5:
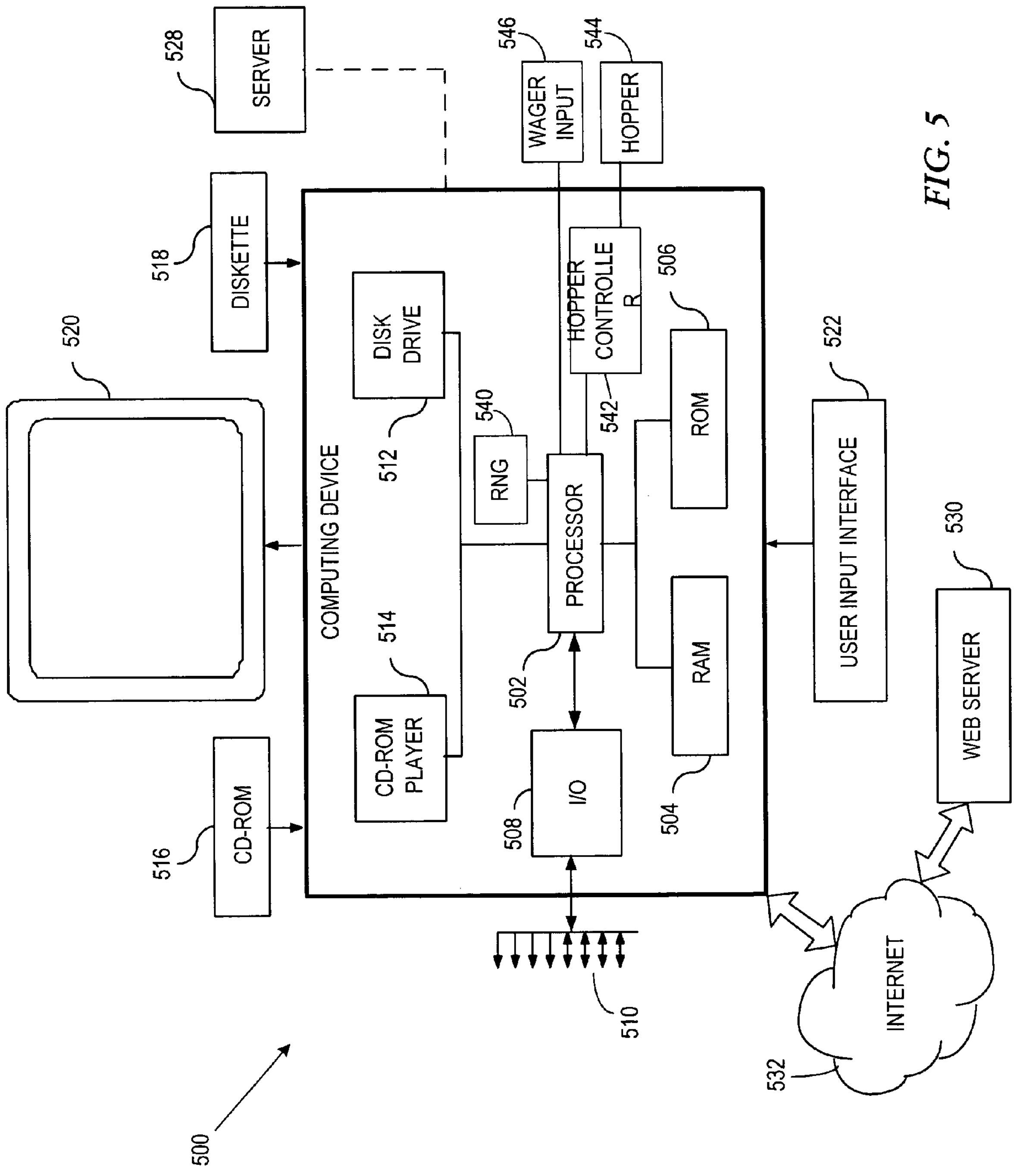
FIG. 5 is a block diagram of a representative computing system capable of carrying out operations in accordance with the invention.

The gaming machines described in connection with the present invention may be independent casino gaming machines, such as slot machines or other special purpose gaming kiosks, video games, or may be computing systems operating under the direction of local gaming software and/or remotely-provided software such as provided by an application service provider (ASP). The casino gaming machines utilize computing systems to control and manage the gaming activity. An example of a representative computing system capable of carrying out operations in accordance with the invention is illustrated in FIG. 5.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 500 of FIG. 5 is an example computing structure that can be used in connection with such electronic gaming machines, computers, or other computer-implemented devices to carry out operations of the present invention.

The example computing arrangement 500 suitable for performing the gaming and bonus group elimination functions in accordance with the present invention typically includes a central processor (CPU) 502 coupled to random access memory (RAM) 504 and some variation of read-only memory (ROM) 506. The ROM 506 may also be other types of storage media to store programs, such as programmable ROM (PROM), erasable PROM (EPROM), etc. The processor 502 may communicate with other internal and external components through input/output (I/O) circuitry 508 and bussing 510, to provide control signals, communication signals, and the like.

Chance-based gaming systems such as slot machines, in which the present invention is applicable, are governed by random numbers and processors. Electronic reels are used to display the result of the digital reels which are actually stored in computer memory and "spun" by a random number generator (RNG). RNGs are well-known in the art, and may be implemented using hardware, software operable in connection with the processor 502, or some combination of hardware and software. In accordance with generally known technology in the field of slot machines, the processor 502 associated with the slot machine, under appropriate program instruction, can simulate the vertical rotation of multiple reels. Generally, the RNG continuously cycles through numbers, even when the machine is not being played. The slot machine selects, for example, three random numbers. The numbers chosen at the moment the play is initiated are typically the numbers used to determine the final outcome, i.e., the outcome is settled the moment the reels are spun. The resulting random numbers are generally divided by a fixed number. This fixed number is often thirty-two, but for slot machines with large progressive jackpots it may be even greater. After dividing, the remainders will be retained. For example, if the divisor was one-hundred twenty-eight, the machine would have three remainders ranging from zero to one-hundred twenty-seven. The remainders may be considered as stops on virtual reels. If the divisor was one-hundred twenty-eight, then the virtual reels would each have one-hundred twenty-eight stops with each stop being equally likely. Each stop on the virtual reel may be mapped to a stop on an actual reel or displayed reel image. These reel images may then be displayed on the display 520. The present invention is operable using any known RNG, and may be integrally programmed as part of the processor 502 operation, or alternatively may be a separate RNG controller 540. RNGs are well known in the art, and any type of RNG may be implemented for the standard mode of play and/or the bonus mode of play in accordance with the invention.

The computing arrangement 500 may also include one or more data storage devices, including hard and floppy disk drives 512, CD-ROM drives 514, and other hardware capable of reading and/or storing information such as DVD, etc. In one embodiment, software for carrying out the standard and bonus gaming operations in accordance with the present invention may be stored and distributed on a CD-ROM 516, diskette 518 or other form of media capable of portably storing information. These storage media may be inserted into, and read by, devices such as the CD-ROM drive 514, the disk drive 512, etc. The software may also be transmitted to the computing arrangement 500 via data signals, such as being downloaded electronically via a network, such as the Internet. Further, as previously described, the software for carrying out the functions associated with the present invention may alternatively be stored in internal memory/storage of the computing device 500, such as in the ROM 506. The computing arrangement 500 is coupled to the display 520, which represents a display on which the gaming activities in accordance with the invention are presented. The display 520 merely represents the "presentation" of the video information in accordance with the invention, and may be any type of known display or presentation screen, such as LCD displays, plasma display, cathode ray tubes (CRT), etc. Where the computing device 500 represents a stand-alone or networked computer, the display 520 may represent a standard computer terminal or display capable of displaying multiple windows, frames, etc. Where the computing device is embedded within an electronic gaming machine, such as slot machine 400 of FIG. 4, the display 520 corresponds to the display screen 410 of FIG. 4. A user input interface 522 such as a mouse or keyboard may be provided where the computing device 500 is associated with a standard computer. An embodiment of a user input interface 522 is illustrated in connection with an electronic gaming machine 400 of FIG. 4 as the various "buttons" 408. Other user input interface devices include a keyboard, a mouse, a microphone, a touch pad, a touch screen, voice-recognition system, etc.

The computing arrangement 500 may be connected to other computing devices or gaming machines, such as via a network. The computing arrangement 500 may be connected to a network server 528 in an intranet or local network configuration. The computer may further be part of a larger network configuration as in a global area network (GAN) such as the Internet. In such a case, the computer accesses one or more web servers 530 via the Internet 532.

Other components directed to slot machine implementations include manners of gaming participant payment, and gaming machine payout. For example, a slot machine including the computing arrangement 500 may also include a hopper controller 542 to determine the amount of payout to be provided to the participant. The hopper controller may be integrally implemented with the processor 502, or alternatively as a separate hopper controller 542. A hopper 544 may also be provided in slot machine embodiments, where the hopper serves as the mechanism holding the coins/tokens of the machine. The wager input module 546 represents any mechanism for accepting coins, tokens, coupons, bills, credit cards, smart cards, membership cards, etc. for which a participant inputs a wager amount.

Figure 6:
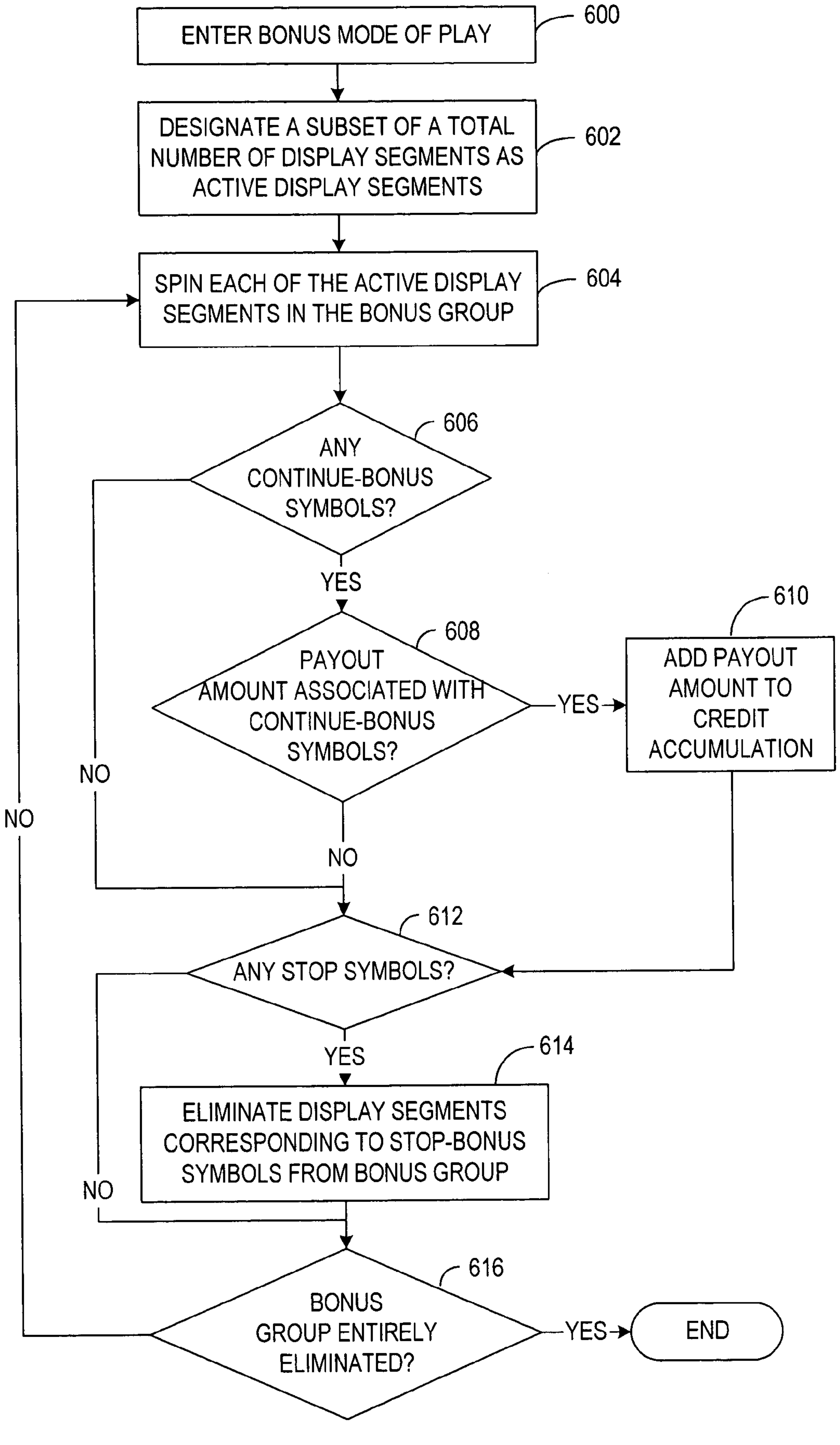
FIGS. 6 and 7 are flow diagrams illustrating representative embodiments of the elimination bonus features in accordance with the present invention.

FIG. 6 is a flow diagram illustrating one embodiment of the elimination bonus features in accordance with the present invention. In one embodiment of the invention, the display segment elimination features of the invention are implemented in connection with a bonus activity. The bonus mode of play is entered 600. A subset of all display segments on the display are designated as "active" display segments, as shown at block 602. The active display segments may be presented on any predetermined subset of the entire display segment grid. For example, the active display segments may be presented on a particular grid row, grid column, or other grid pattern. In one embodiment, the display segments that are deemed "active" are those that correspond to the symbols during the standard mode of play that gave rise to the bonus mode. For example, if three predetermined symbols occur during the standard mode of play that invoke the bonus mode, then those corresponding display segments become the active display segments during the bonus activity.

Each of the active display segments may be considered part of a "bonus group." As shown at block 604, each of the active display segments of the bonus group are subjected to an electronic "spin," similar to the manner in which reels are spun in the standard mode slot game. In one embodiment, each of the active display segments is an independent payline, such that the symbol occurring in each active display segment determines, independent of the other display segments, the result of that display segment single-symbol payline. The RNG randomly stops the spinning activity in each of the active display segments, and it is determined 606 whether any continue-bonus symbols are presented in the bonus group. If not, it is determined whether the bonus group includes any stop symbols 612. However, some or all of the continue-bonus symbols may have a payout value associated therewith, as determined at decision block 608. If so, the payout amount is added 610 to the credit accumulation, which may be added immediately, at the end of the bonus activity, or at any other predetermined time.

It is determined 612 whether any stop symbols formed part of the bonus group. If so, those display segments corresponding to stop-bonus symbols are eliminated 614 from the bonus group. If the bonus group has been entirely eliminated 616, the bonus activity ends. In other words, once each of the active display segments of the bonus activity receives a stop-bonus symbol, the bonus activity ends. If the bonus group has not been entirely eliminated as determined at decision block 616, the remaining active display segments of the bonus group (which may be a smaller bonus group due to the elimination of one or more display segments) are again spun as shown at block 604. This process of eliminating display segments associated with stop-bonus symbols, and retaining display segments associated with continue-bonus symbols, continues until all display segments have presented a stop-bonus symbol therein. At least some, and in some embodiments all, of the continue-bonus symbols are associated with a payout value which is awarded to the participant.

Figure 7:
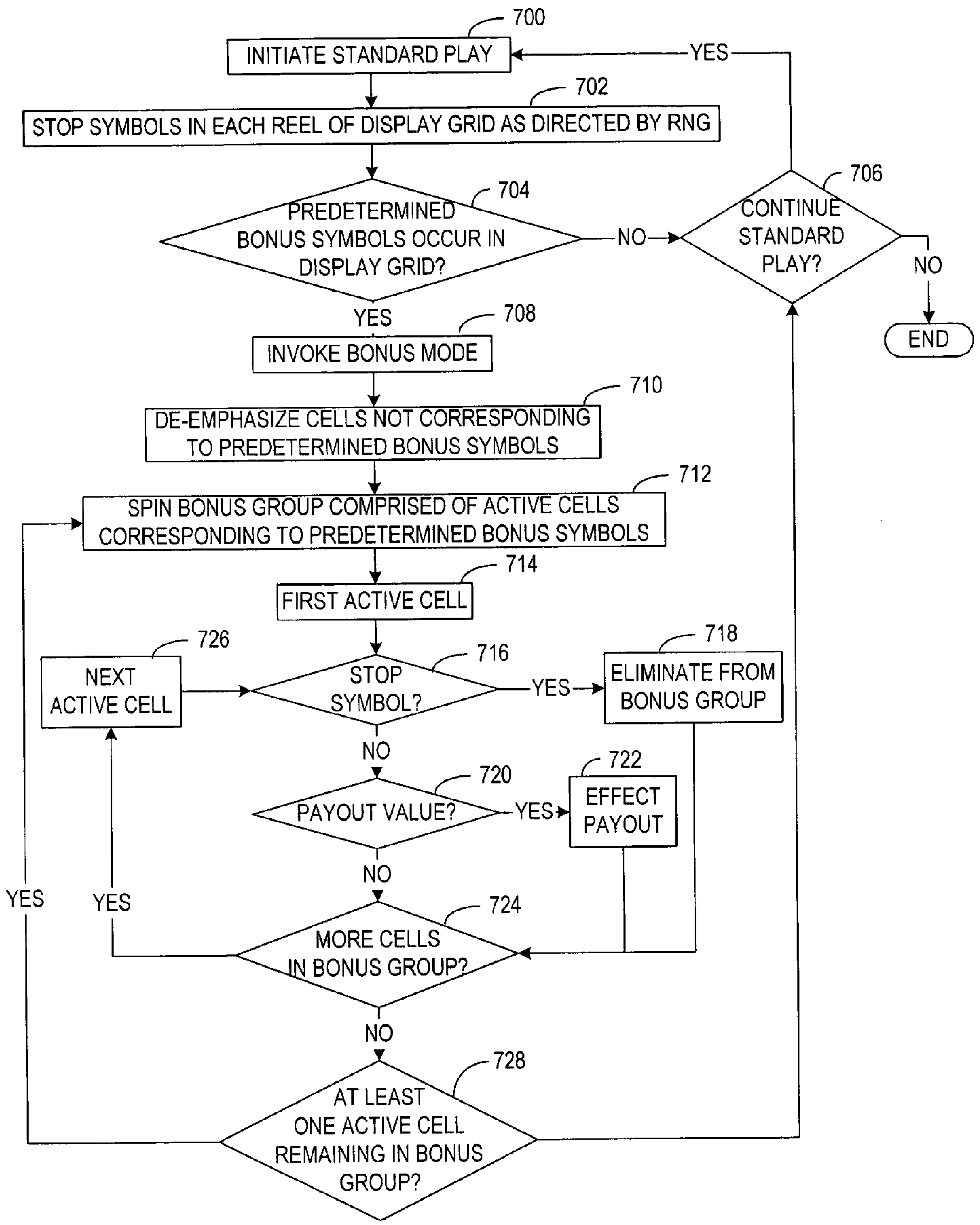

FIG. 7 is another embodiment of the elimination bonus features in accordance with the present invention. In this exemplary embodiment, a standard mode of play is initiated 700. An example of participating in the standard mode is to engage in normal slot game play, where a plurality of reels having symbols are spun, and payouts may be effected based on the symbol combinations occurring on one or more paylines. During this standard mode of play, the symbols in each reel of the display grid are stopped in accordance with an RNG or other random generation engine, as shown at block 702. The bonus mode will be invoked if a predetermined one or more bonus symbols (or symbol arrangement) occurs in the display grid. Whether the predetermined symbols occur during standard mode play is determined at decision block 704. If the predetermined symbols giving rise to the bonus mode do not occur, the participant may decide 706 whether or not to continue standard play. If the predetermined symbols giving rise to the bonus mode are presented on the display grid, the bonus mode is invoked 708.

When the bonus mode is invoked, one embodiment of the invention includes de-emphasizing 710 those display segments or "cells" that do not correspond to the predetermined bonus symbols. For example, these cells may be "grayed out" or otherwise distinguished from those cells that do correspond to the predetermined bonus symbols. The active cells corresponding to where the predetermined bonus symbols occurred during standard play may be referred to herein as the "bonus group." The next step is to spin 712 the active cells associated with the bonus group. For example, each of the active cells will appear as if a reel is spinning at its respective location.

When this spinning action stops, a first one of the active cells is considered, as shown at block 714. If the symbol at this first cell is a stop-bonus symbol as determined at decision block 716, it will be eliminated 718 from the bonus group. If the symbol is not a stop-bonus symbol, it is a continue-bonus symbol, and it is determined 720 whether that continue-bonus symbol has an associated payout value. If so, that payout is effected 722. For example, the accumulated credit total, and/or a cell payout subtotal, may be incremented according to the payout value. It is determined 724 whether there are more active cells in the bonus group, and if so, the next active cell 726 is considered. This process continues for each of the active cells comprising the bonus group that was spun at block 712. It should be noted that the process including blocks 714, 716, 718, 720, 722, 724, and 726 are illustrated as being carried out in a sequential manner, however this is for purposes of facilitating an understanding of how each of the various active cells is analyzed for its resulting symbol. Those skilled in the art will readily recognize that these steps may be carried out serially, concurrently, or serial in part and concurrent in part.

When all of the active cells of the bonus group have been analyzed, it is determined 728 whether there is at least one active cell remaining in the bonus group. If so, this means that the bonus activity is still operative, and the "new" bonus group can then be spun 712. The "new" bonus group will include all cells that did not have stop-bonus symbols associated therewith. Therefore, the bonus group will ultimately shrink in the number of active cells, until all cells have been eliminated from the bonus group.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

One skilled in the art of computer science from the description provided herein will be able to combine the software created as described with appropriate general purpose or special purpose computer hardware to create a computer system and/or computer subcomponents embodying the invention, and to create a computer system and/or computer subcomponents for carrying out methods of the invention.

Many modifications and variations are possible in light of the above teaching. For example, the present invention is not limited to what is traditionally known as "slot machines." The present invention is applicable to any gaming device to incorporate bonus rounds in connection with a gaming system. Also, while the illustrated embodiments have been described in large part in connection with a "slot machine," other gaming systems and concepts are also within the scope of the invention, such as video poker games, card games, lotteries, and other casino events implementing a video screen.

Further, it should be recognized that the manner of providing a repeated elimination of display segments as described herein may be applied during a standard mode of play, rather than in a bonus mode of play. For example, the standard mode of play be configured to allow the participant to continually engage in such a repeated elimination slot game without entering a bonus mode. In such a case, it may be preferred to provide a higher percentage of "continue" symbols that are associated with no credit award, or lesser credit awards to arrive at the targeted payout percentage of the slot game. Where the present invention is utilized as a standard play game, the user would first initiate the standard play (e.g., by pulling a lever, pushing a "play," "spin," "bet maximum credits," or other analogous play initiation button). In one such embodiment, all of the display segments, or a predetermined or random subset of the display segments are activated. These activated display segments are then spun, and stopped to randomly provide symbols in each of the activated display segments. Continue symbols would keep the associated display segments active for a subsequent spin, while stop or "discontinue" symbols would be eliminated from further spins for the remainder of that particular play event. Either or both of the continue symbols may be associated with credit awards, or may be associated with no credit award. In any case, the continue symbols allow the associated display segment to remain active, while discontinue symbols prohibit the associated display segment from further activity during that play event. The activated display segments repeatedly reduce in number as discontinue symbols appear, until each of the display segments have been associated with a discontinue symbol, thereby ending that particular play event. The standard play would then continue by initiating a new play event. Further, bonus rounds may still be associated with this standard play activity, and in one embodiment, the principles of the present invention may also be applied to that bonus event, such as by providing statistically higher credit awards to the continue (and optionally discontinue) symbols during the bonus event.

As can be seen from the foregoing description, the exemplary embodiments of the invention described herein have been presented for the purposes of illustration and description, and many modifications and variations are possible in light of the above teaching. The description of these exemplary embodiments is not intended to be exhaustive or to limit the invention to the precise form disclosed. It is thus not intended that the scope of the invention be limited with this detailed description, but rather by the claims appended hereto.

What is claimed is:

1. A method for facilitating a play of a slot game after placement of a wager, the method comprising:

(a) presenting, in the play of the slot game, a mechanical reel configuration comprising a plurality of active reel segments;

(b) presenting symbols in each of the active reel segments;

(c) providing an award, if any, based on the symbols presented in each of the active reel segments;

(d) deactivating the active reel segments that are associated with a discontinue symbol;

(e) determining which active reel segments, if any, have been deactivated; and (f) repeating (b) to (e) in the same play of the slot game without placement of another wager until a predetermined number of the active reel segments have been deactivated.

2. The method as in claim 1, wherein presenting a mechanical reel configuration comprising a plurality of active reel segments comprises presenting the active reel segments in a bonus mode of play in response to presentation of a symbol combination during a standard mode of play that invokes the bonus mode of play.

3. The method as in claim 2, wherein a bonus symbol set comprising the symbols presented in each of the active reel segments during the bonus mode of play is different than a standard symbol set comprising standard symbols presented in the mechanical reel configuration during the standard mode of play.

4. The method as in claim 1, further comprising at least partially randomly selecting which symbol is to be presented in each of the active reel segments.

5. The method as in claim 4, wherein at least partially randomly selecting which symbol is to be presented comprises associating a reel strip having a predetermined symbol set to each of the active reel segments.

6. The method as in claim 5, wherein associating a reel strip having a predetermined symbol set to each of the active reel segments comprises associating a different reel strip to each of the active reel segments.

7. The method as in claim 4, wherein at least partially randomly selecting which symbol is to be presented comprises associating a predetermined symbol set to each of the active reel segments.

8. The method as in claim 4, wherein at least partially randomly selecting which symbol is to be presented comprises associating a predetermined symbol set to a plurality of the active reel segments.

9. The method as in claim 1, wherein the active reel segments that are deactivated by being associated with a discontinue symbol are de-emphasized to be distinguished from the active reel segments.

10. The method as in claim 9, further comprising retaining the discontinue symbol in each of the active reel segments that are deactivated, thereby distinguishing the deactivated reel segments from the active reel segments.

11. The method as in claim 1, wherein presenting symbols in each of the active reel segments comprises presenting continue symbols in one or more of the active reel segments, wherein the continue symbols direct its respective one of the active reel segments to remain active.

12. The method as in claim 11, further comprising associating a credit award with one or more of the continue symbols.

13. The method as in claim 12, wherein associating a credit award comprises associating a positive credit award having an additive effect on an accumulated credit total.

14. The method as in claim 12, wherein associating a credit award comprises associating a null credit award having no positive or negative effect on an accumulated credit total.

15. The method as in claim 12, wherein associating a credit award comprises associating a negative credit award having a subtractive effect on an accumulated credit total.

16. The method as in claim 1, further comprising associating a credit award with one or more of the discontinue symbols.

17. The method as in claim 16, wherein associating a credit award comprises associating a positive credit award having an additive effect on an accumulated credit total.

18. The method as in claim 16, wherein associating a credit award comprises associating a null credit award having no positive or negative effect on an accumulated credit total.

19. The method as in claim 16, wherein associating a credit award comprises associating a negative credit award having a subtractive effect on an accumulated credit total.

20. The method as in claim 1, further comprising deactivating a predetermined plurality of the active display segments in response to deactivation of one of the active reel segments that is associated with a discontinue symbol.

21. The method as in claim 1, wherein repeatedly presenting symbols comprises automatically repeating presenting symbols and deactivating the active reel segments until all of the active reel segments have been deactivated.

22. The method as in claim 1, wherein repeatedly presenting symbols comprises providing a user interface to allow a participant to initiate each repeated presentation of symbols until all of the active reel segments have been deactivated.

23. The method as in claim 1, wherein repeatedly presenting symbols and deactivating the active reel segments until a predetermined number of the active reel segments have been deactivated comprises deactivating the active reel segments until all of the active reel segments have been deactivated.

24. A casino gaming apparatus hosting a game having at least a standard mode of operation operable after placement of a wager and a bonus mode of operation, the casino gaming apparatus comprising:

a video screen to present, in a play of the game, a display grid having a plurality of display cells;

a user interface to facilitate player participation in at least the standard mode of operation; and a processor programmed to (i) identify a predetermined symbol combination occurring on the display grid during the standard mode of operation to activate the bonus mode of operation, and during the bonus mode of operation, in the same play of the game, the processor programmed to:

(ii) randomly present symbols via a physical reel configuration which includes one or more active reels having corresponding reel strips, (iii) provide an award, if any, based on the symbols randomly presented via any of the active reels, (iv) deactivate any of the active reels presenting a discontinue symbol, (v) determine which active reels, if any, have been deactivated, and (vi) repeat the random presentation of symbols without placement of another wager, the provision of an award, if any, the deactivation of the reels associated with the discontinue symbol, and the determination of which reels, if any, have been deactivated until a predetermined number of the reels have been deactivated.

25. The casino gaming apparatus as in claim 24, wherein the processor comprises a random number generator configured to randomly select the symbols for presentation via the reels.

26. The casino gaming apparatus as in claim 24, wherein the user interface comprises a user interface mechanism to allow the player to initiate each repetition of the random presentation of symbols.

27. A casino gaming apparatus hosting a game having at least a standard mode of operation and a bonus mode of operation, the casino gaming apparatus comprising:

a video screen to present, in a play of the game, a display grid having a plurality of display cells;

a user interface to facilitate player participation in at least the standard mode of operation;

a processor programmed to (i) identify a predetermined symbol combination occurring on the display grid during the standard mode of operation to activate the bonus mode of operation, and during the bonus mode of operation, in the same play of the game, the processor programmed to:

(ii) randomly present symbols via a physical reel configuration which includes one or more active reels having corresponding reel strips, (iii) provide an award, if any, based on the symbols randomly presented via any of the active reels, (iv) deactivate any of the active reels presenting a discontinue symbol, (v) determine which active reels, if any, have been deactivated, (vi) repeat the random presentation of symbols, the provision of an award, if any, the deactivation of the reels associated with the discontinue symbol, and the determination of which reels, if any, have been deactivated until a predetermined number of the reels have been deactivated, and (vii) cause a bonus payout bar to present award subtotals for each of the reels associated with the bonus mode of operation.

28. The casino gaming apparatus as in claim 24, wherein the processor is further programmed to automatically repeat the random presentation of symbols and deactivation of the reels associated with the discontinue symbols until all of the active display cells have been deactivated without player intervention.

29. The casino gaming apparatus as in claim 24, wherein the casino gaming apparatus comprises a slot machine, and the standard mode of operation of the slot machine is a slot game.

30. The casino gaming apparatus as in claim 24, wherein the casino gaming apparatus comprises a video poker machine, and the standard mode of operation of the video poker machine is a poker game.

31. The casino gaming apparatus as in claim 24, wherein the casino gaming apparatus comprises a video bingo machine, and the standard mode of operation of the video bingo machine is a bingo game.

32. The casino gaming apparatus as in claim 24, wherein the casino gaming apparatus comprises a video keno machine, and the standard mode of operation of the video keno machine is a keno game.

33. The casino gaming apparatus as in claim 24, wherein the processor is programmed to repeat the random presentation of symbols and deactivation of the reels associated with the discontinue symbols until all of the reels have been deactivated.

34. A casino gaming apparatus hosting a game having at least a standard mode of operation operable after placement of a wager and a bonus mode of operation, the casino gaming apparatus comprising:

a first reel configuration to display, in a play of the game, a plurality of display cells;

a user interface to facilitate player participation in at least the standard mode of operation; and a processor programmed to (i) identify a predetermined symbol combination occurring on the first reel configuration during the standard mode of operation to activate the bonus mode of operation, and during the bonus mode of operation, in the same play of the game, the processor programmed to:

(ii) randomly present symbols via a second reel configuration which includes one or more active reels having corresponding reel strips, (iii) provide an award, if any, based on the symbols randomly presented via any of the active reels, (iv) deactivate any of the active reels presenting a discontinue symbol, (v) determine which active reels, if any, have been deactivated, and (vi) repeat the random presentation of symbols without placement of another wager, the provision of an award, if any, the deactivation of the reels associated with the discontinue symbol, and the determination of which active reels, if any, have been deactivated until a predetermined number of the reels have been deactivated.

35. A method for facilitating a play of a slot game after placement of a wager, the method comprising:

(a) presenting, in the play of the slot game, a display grid comprising a plurality of active display segments;

(b) presenting symbols in each of the active display segments;

(c) providing an award, if any, based on the symbols presented in each of the active display segments;

(d) deactivating the active display segments that are associated with a discontinue symbol;

(e) determining which active display segments, if any, have been deactivated; and (f) repeating (b) to (e) in the same play of the slot game without placement of another wager until a predetermined number of the active display segments have been deactivated.

36. The method as in claim 1, wherein the deactivated reel segments are prevented from presenting another symbol in the same play of the game.

37. The casino gaming apparatus as in claim 24, wherein the deactivated reels are prevented from presenting another symbol in the same play of the game.

38. The casino gaming apparatus as in claim 34, wherein the deactivated reels are prevented from presenting another symbol in the same play of the game.

39. The method as in claim 35, wherein the deactivated display segments are prevented from presenting another symbol in the same play of the game.

* * * * *